US008325234B2

(12) United States Patent
Kii

(10) Patent No.: US 8,325,234 B2
(45) Date of Patent: Dec. 4, 2012

(54) INFORMATION PROCESSING APPARATUS, INFORMATION PROCESSING METHOD, AND PROGRAM FOR STORING AN IMAGE SHOT BY A CAMERA AND PROJECTED BY A PROJECTOR

(75) Inventor: Manabu Kii, Tokyo (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 12/748,664

(22) Filed: Mar. 29, 2010

(65) Prior Publication Data

US 2010/0259633 A1 Oct. 14, 2010

(30) Foreign Application Priority Data

Apr. 14, 2009 (JP) ................. 2009-097723

(51) Int. Cl.
H04N 7/18 (2006.01)
H04N 5/235 (2006.01)
H04N 5/228 (2006.01)
G09G 5/00 (2006.01)

(52) U.S. Cl. ..................... 348/161; 348/158; 348/222.1; 345/633

(58) Field of Classification Search .................. 345/633; 348/158, 159, 161, 207.99, 222.1
See application file for complete search history.

(56) References Cited

U.S. PATENT DOCUMENTS

| 6,037,936 | A * | 3/2000 | Ellenby et al. ............. 715/764 |
| 6,067,112 | A * | 5/2000 | Wellner et al. ............ 348/211.4 |
| 6,690,357 | B1 | 2/2004 | Dunton et al. |
| 7,508,978 | B1 * | 3/2009 | Lefevere et al. ............. 382/154 |
| 7,576,727 | B2 * | 8/2009 | Bell ............................... 345/158 |
| 7,680,324 | B2 * | 3/2010 | Boncyk et al. ............... 382/165 |
| 7,812,860 | B2 * | 10/2010 | King et al. ............... 348/210.99 |
| 7,986,843 | B2 * | 7/2011 | Chaudhury et al. .......... 382/229 |
| 8,004,571 | B2 * | 8/2011 | Yamashita ............... 348/211.12 |
| 2002/0102966 | A1 * | 8/2002 | Lev et al. ...................... 455/412 |
| 2003/0164819 | A1 * | 9/2003 | Waibel ........................ 345/173 |
| 2004/0113885 | A1 * | 6/2004 | Genc et al. .................... 345/156 |
| 2004/0183775 | A1 * | 9/2004 | Bell ............................... 345/156 |
| 2006/0002607 | A1 * | 1/2006 | Boncyk et al. ............... 382/165 |
| 2006/0192782 | A1 * | 8/2006 | Hildreth ....................... 345/473 |
| 2006/0240862 | A1 * | 10/2006 | Neven et al. ................. 455/550.1 |
| 2006/0251334 | A1 * | 11/2006 | Oba et al. ..................... 382/275 |
| 2006/0262188 | A1 * | 11/2006 | Elyada et al. ................. 348/143 |
| 2008/0279481 | A1 * | 11/2008 | Ando ............................ 382/306 |
| 2009/0096909 | A1 * | 4/2009 | Yamashita ............... 348/333.01 |
| 2010/0199232 | A1 * | 8/2010 | Mistry et al. ................. 715/863 |
| 2011/0130159 | A1 | 6/2011 | Chen et al. |

FOREIGN PATENT DOCUMENTS

| CN | 1322329 A | 11/2001 |
| CN | 1767559 A | 5/2006 |
| CN | 101147188 A | 3/2008 |
| CN | 101650520 A | 2/2010 |

* cited by examiner

*Primary Examiner* — Nicholas Giles

(74) *Attorney, Agent, or Firm* — Oblon, Spivak, McClelland, Maier & Neustadt, L.L.P.

(57) ABSTRACT

An information processing apparatus includes a projector, a camera, a first storage, and a controller. The projector projects a projection image containing a first operation image onto a predetermined area. The camera shoots an image of a subject within the predetermined area. The controller detects an operation to the first operation image based on the shot image shot by the camera and controls the first storage to store at least the image of the subject out of the shot image when the operation is detected.

10 Claims, 16 Drawing Sheets

INFORMATION PROCESSING APPARATUS, INFORMATION PROCESSING METHOD, AND PROGRAM FOR STORING AN IMAGE SHOT BY A CAMERA AND PROJECTED BY A PROJECTOR

BACKGROUND OF THE INVENTION

1. Field of the Invention

The present invention relates to an information processing apparatus including a camera and a projector, an information processing method for the information processing apparatus, and a tangible computer-readable medium therefor.

2. Description of the Related Art

From the past, apparatuses in which an image shot by a camera is displayed by a projector are known. For example, Japanese Patent Application Laid-open No. 2006-251206 (hereinafter, referred to as Patent Document 1) discloses an information presentation apparatus in which a shot image of an object that is shot by a camera and additional information that is input from an input apparatus are combined to create a projection image, and the projection image is associated with a position where the object exists and is projected. Accordingly, the information presentation apparatus can leave a trail of the object even after the object is moved.

SUMMARY OF THE INVENTION

Incidentally, there may be a case where a user desires to store (capture), in the apparatus, the image of the object that is shot by the camera and projected by the projector as described above. In the technique disclosed in Patent Document 1, the shot image of the object is captured in the information presentation apparatus to be combined with the additional information, but the capture is executed automatically and the user does not become involved in that processing. Therefore, when the user places a desired object in a shooting (imaging) range, there is a probability that an image that is not intended by the user is stored.

Further, though in the technique disclosed in Patent Document 1, the additional information associated with the object is superimposed on the projection image, the additional information is input by an input apparatus (keyboard, mouse, etc.) of the information presentation apparatus connected to a camera and a projector. The technique assumes a case such as a presentation, a web conference, etc. where a plurality of persons share a projection image on a large-size screen or the like and each person inputs information on the projection image from an information presentation apparatus that the person has at hand.

However, assuming a case where an image of an object is shot and projected while the object is placed in a smaller area such as a desk and a floor, a user pays attention to a projection area thereof and also needs to hold the object or place it within the projection area. Accordingly, in a case where the user performs an operation for storing the image of the object in the apparatus by using the input apparatus, the operation is made complicated and results in lack of intuitiveness.

In view of the circumstances as described above, there is a need for an information processing apparatus, an information processing method, and a tangible computer-readable medium including a program that are capable of storing an image shot by a camera and projected by a projector by an easy and intuitional operation.

According to an embodiment of the present invention, there is provided an information processing apparatus including a projector, a camera, a first storage, and a controller. The projector projects a projection image containing a first operation image onto a predetermined area. The camera shoots an image of a subject within the predetermined area. The first storage is a RAM (Random Access Memory), a built-in flash memory, a memory card, an HDD (Hard Disk Drive), an optical disc, or the like. The controller detects an operation to the first operation image based on the shot image shot by the camera and controls the first storage to store at least the image of the subject out of the shot image when the operation is detected.

The first operation image refers to an image serving as a target of a user operation, such as an icon, a button, graphics, and a character. The detection of the operation to the first operation image is executed by, for example, detecting whether a finger of the user touches the first operation image with use of a difference between shot images at different times. The subject is, for example, a business card, a CD jacket, or the like, but is not limited thereto and various things are assumed as the subject.

With this structure, the image of the subject is stored when the operation to the first operation image contained in the projection image is detected. Accordingly, the user can cause the first storage to store the image of a desired subject easily and intuitionally by only the operation to the projection image without touching the portable information apparatus itself.

The information processing apparatus may further include a second storage. In this case, the controller may recognize metadata of the subject based on the shot image and control the second storage to store the metadata as a part of a predetermined list.

Further, the second storage may store the shot image stored in the first storage or the image of the subject that is extracted from the shot image, together with the metadata.

The second storage is a RAM, a built-in flash memory, a memory card, an HDD, an optical disc, or the like, and may be the same as or different from the first storage. In a case where the first storage and the second storage are different from each other, typically, the first storage is a temporary recording medium such as a RAM (clipboard) and the second storage is a nonvolatile recording medium such as a built-in flash memory, a memory card, an HDD, and an optical disc.

The metadata is data associated with the subject, such as data of an identity of the subject, copyright information, and characters contained in the subject. Recognition of the metadata is executed using an image recognition technology such as pattern matching and feature recognition and a character recognition technology such as an OCR (Optical Character Reader). The predetermined list is a list corresponding to a type of each subject, such as a content list and a contact list. The metadata may be stored as a part of the list together with the image of the subject or stored separately from the image of the subject.

Accordingly, the user can cause the information processing apparatus to store not only the image itself of the subject but also the metadata of the subject in the second storage by an easy and intuitional operation.

The controller may control the projector to include, in the projection image, information indicating whether the metadata has been recognized.

Accordingly, the user can easily grasp whether the metadata of the subject has been recognized. Further, in a case where the metadata has not been recognized, the user can reliably execute the recognition by performing an operation for improving recognition accuracy, such as changing a position or posture of the subject within the predetermined area.

The controller may control the projector to make illuminance of the projection image larger than illuminance before the operation is detected for a predetermined time period since the detection.

Accordingly, the information processing apparatus can artificially reproduce a flash of a still camera in related art by using the projection image of the projector. Thus, the user can intuitively recognize that the image has been stored without checking the stored image. The predetermined time period is, for example, about 0.5 to 1.5 seconds, but is not limited to this range. The predetermined time period may be any time period as long as the user can recognize that the image has been stored.

The controller may detect whether the subject is present within the predetermined area based on the shot image and control the projector to include the first operation image in the projection image when it is detected that the subject is present within the predetermined area.

Accordingly, since the first operation image is projected only when the subject is present within the predetermined area, it is possible to prevent the first operation image from being projected in spite of absence of the subject and visibility from being impaired. Further, the user can easily recognize that the image of the subject is ready to be stored. The presence/absence of the subject is detected using a difference between shot images at different times.

The controller may control the second storage to store the metadata when it is detected that the subject whose metadata has been recognized is not present within the predetermined area.

Accordingly, after the image of the subject is stored in the first operation image, the user can cause the image of the subject and the metadata to be stored in the second storage as a part of the list by only removing the subject from the predetermined area.

In this case, the controller may recognize pieces of metadata from a plurality of subjects that are present within the predetermined area. Then, the controller may control the second storage to store the pieces of metadata at a time as a part of the predetermined list when it is detected that all the plurality of subjects are not present within the predetermined area.

Accordingly, by only placing the plurality of subjects within the predetermined area and removing the subjects from the predetermined area after images of the subjects are stored in the first storage, the user can cause the images and the metadata of all the subjects to be stored at a time in the second storage.

Further, the controller may recognize pieces of metadata from a first subject and a second subject that is a different type from that of the first subject, the first subject and the second subject being present within the predetermined area. Then, the controller may control the second storage to store first metadata of the first subject as a part of a first list when it is detected that the first subject is not present within the predetermined area. Similarly, the controller may control the second storage to store second metadata of the second subject as a part of a second list when it is detected that the second subject is not present within the predetermined area.

Accordingly, by only placing different types of subjects within the predetermined area and removing the subjects from the predetermined area after images of the subjects are stored in the first storage, the user can cause the metadata of all the subjects to be stored in the second storage as a part of the list corresponding to the types of the subjects.

The controller may control the projector to include a second operation image different from the first operation image in the projection image when the metadata is recognized. Then, the controller may detect an operation to the second operation image based on the shot image and control the second storage to store the metadata when the operation is detected.

The second operation image is also an image serving as a target of a user operation, such as an icon, a button, graphics, and a character, and is projected in a state distinguishable from the first operation image.

Accordingly, the user can cause the metadata of the subjects to be stored in the second storage as a part of a list by an easy and intuitional operation to the second operation image.

In this case, the controller may recognize pieces of metadata from a plurality of subjects that are present within the predetermined area. Then, the controller may control the second storage to store the pieces of metadata at a time as a part of the predetermined list when the operation to the second operation image is detected.

Accordingly, by only placing the plurality of subjects within the predetermined area and performing a single operation to the second operation image after images of the subjects are stored in the first storage, the user can cause the metadata of all the subjects to be stored in the second storage.

Further, the controller may recognize pieces of metadata from a first subject and a second subject that is a different type from that of the first subject, the first subject and the second subject being present within the predetermined area. Then, the controller may control the second storage to store the first subject and first metadata of the first subject as a part of a first list when the operation to the second operation image is detected. Similarly, the controller may control the second storage to store the second subject and second metadata of the second subject as a part of a second list.

Accordingly, by only placing different types of subjects within the predetermined area and performing a single operation to the second operation image after images of the subjects are stored in the first storage, the user can cause the metadata of the subjects to be stored in the second storage as a part of a list corresponding to the types of the subjects.

The controller may control the projector to project a pseudo animation showing how the metadata is being stored as a part of the predetermined list by using the image of the subject.

Accordingly, by causing the user to view the state where the metadata is stored, the information processing apparatus can cause the user to easily grasp that the metadata has been stored while increasing interests of the user.

The controller may detect, after the image of the subject is stored in the first storage, whether the subject is moved from a position where the image of the subject has been stored. Then, the controller may control the projector to project the image of the subject that is stored in the first storage to the position where the image of the subject has been stored when it is detected that the subject is moved.

Accordingly, even when the subject is removed from the predetermined area, the user can easily recognize that the image of the subject has been stored in the first storage.

According to another embodiment of the present invention, there is provided an information processing method in an information processing apparatus including a projector, a camera, and a storage.

In the information processing method, a projection image containing an operation image is projected onto a predetermined area by the projector. An image of a subject within the predetermined area is shot by the camera. An operation to the operation image is detected based on a shot image shot by the camera. When the operation is detected, at least the image of the subject out of the shot image is stored in the storage.

Since the image of the subject is stored when the operation to the operation image contained in the projection image is detected by the information processing method, the user can cause the storage portion to store the image of a desired subject easily and intuitionally by only the operation to the projection image without touching the information processing apparatus itself.

According to still another embodiment of the present invention, there is provided a tangible computer-readable medium including a program causing an information processing apparatus including a projector, a camera, and a storage to execute a projection step, an image-shooting step, a detection step, and a storage step.

The projection step includes projecting a projection image containing an operation image onto a predetermined area by the projector. The image-shooting step includes shooting an image of a subject within the predetermined area by the camera. The detection step includes detecting an operation to the operation image based on a shot image shot by the camera. The storage step includes storing at least the image of the subject out of the shot image in the storage when the operation is detected.

By executing the program, the image of the subject is stored when the operation to the operation image contained in the projection image is detected. Therefore, the user can cause the storage portion to store the image of a desired subject easily and intuitionally by only the operation to the projection image without touching the information processing apparatus itself.

According to the embodiments of the present invention, it is possible to store the image shot by the camera and projected by the projector by an easy and intuitional operation.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

(General Outline of System)

Figure 1:
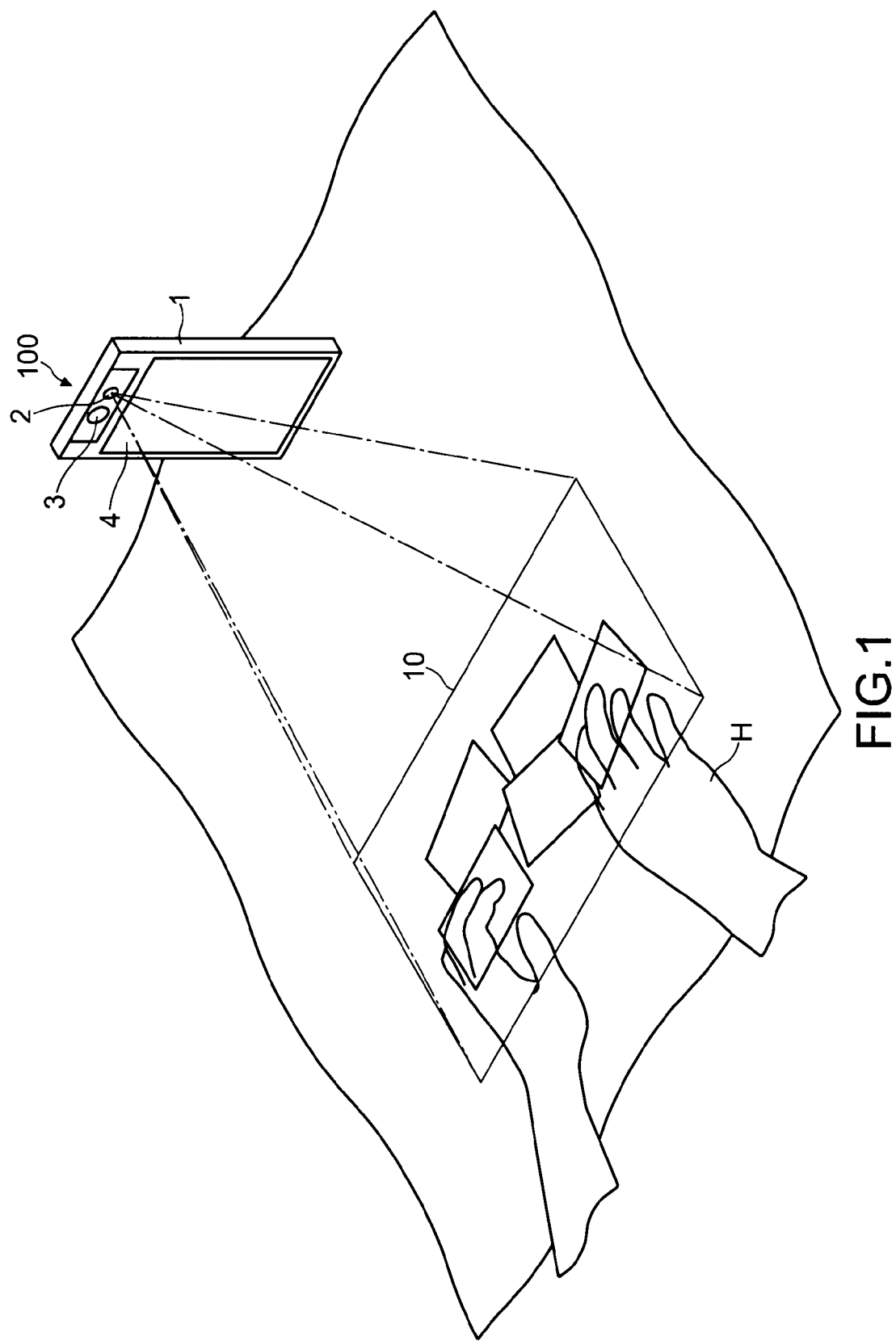
FIG. 1 is a diagram showing an appearance and a use state of a portable information apparatus according to an embodiment of the present invention.

FIG. 1 is a diagram showing an appearance and a use state of a portable information apparatus according to an embodiment of the present invention.

As shown in FIG. 1, a portable information apparatus 100 according to this embodiment includes, for example, a palm-sized casing 1 and is used while being placed on a horizontal plane of a desk, a floor, or the like. Of course, the portable information apparatus 100 may be used while being hung on a vertical plane of a wall or the like.

The portable information apparatus 100 includes a projector 2, a camera 3, and a display 4.

The projector 2 projects a projection image containing a GUI (Graphical User Interface) and image data onto a rectangular projection area 10 in a predetermined range of a desk or a floor. The camera 3 shoots an image of the projection area 10. That is, a projection range of the projector 2 and a shooting range of the camera 3 coincide with each other. A user performs an operation with respect to the projection image of the projector 2 with a finger of a hand H or the like, and the portable information apparatus 100 then recognizes the operation of the user by the camera 3 and executes processing corresponding to that operation. Further, the portable information apparatus 100 shoots an image of a subject placed within the projection area 10 by the user and stores (captures) the shot image in accordance with an operation of the user with respect to the projection image. Moreover, the portable information apparatus 100 projects, by the projector 2, the shot image that is captured or an image of the subject that is extracted from that shot image.

(Hardware Structure of Portable Information Apparatus)

Figure 2:
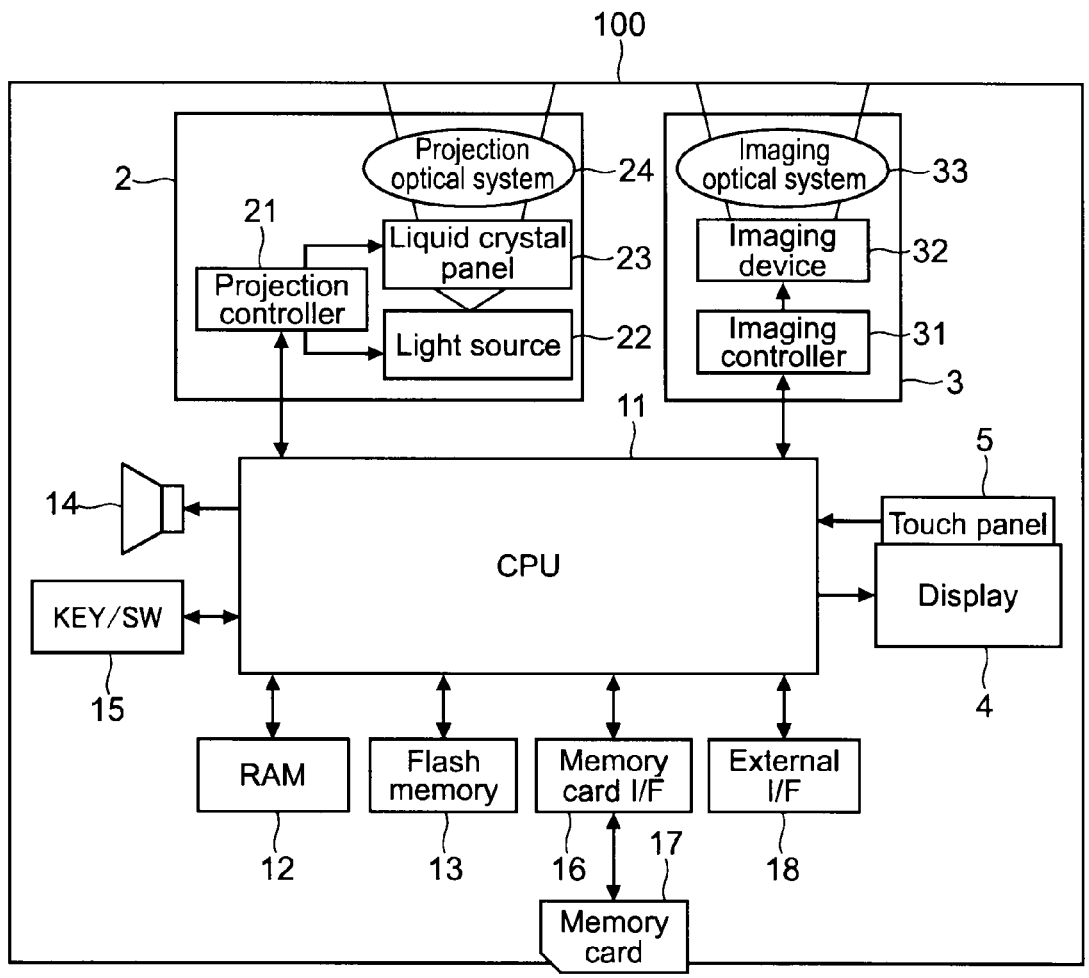
FIG. 2 is a diagram showing a hardware structure of the portable information apparatus according to the embodiment of the present invention.

FIG. 2 is a diagram showing a hardware structure of the portable information apparatus 100.

As shown in FIG. 2, the portable information apparatus 100 includes, in addition to the projector 2, the camera 3, and the display 4, a CPU (Central Processing Unit) 11, a RAM (Random Access Memory) 12, a flash memory 13, a speaker 14, and a key/switch portion 15. The portable information apparatus 100 also includes various interfaces such as a memory card I/F (Interface) 16 and an external I/F (Interface) 18.

The CPU 11 exchanges signals with the respective portions of the portable information apparatus 100 to perform various operations and collectively controls projection processing, imaging processing, and other processing.

The RAM 12 is used as a working area of the CPU 11 and temporarily stores various types of data including, for example, an image shot by the camera 3, an image of a subject that is extracted from that shot image, metadata recognized from that subject to be processed by the CPU 11 and programs. The RAM 12 includes an area (clipboard) for temporarily storing (capturing) the shot image or the image of the subject as described above.

The flash memory 13 is of a NAND type, for example. The flash memory 13 stores various types of data including the shot image, the image and metadata of the subject, an image projected by the projector 2, audios, and texts, and various programs such as a control program and an application to be executed by the CPU 11. Further, the flash memory 13 also captures a shot image or an extracted image of a subject in this embodiment and stores an application program for recognizing and storing metadata. The application may be stored in another recording medium such as a memory card 17. The portable information apparatus 100 may include an HDD in place of or in addition to the flash memory 13.

The speaker 14 outputs audios stored in the flash memory 13 or the like when an image is shot or other operations are performed.

The key/switch portion 15 accepts operations corresponding to functions equivalent to functions that cannot be executed by an operation to a touch panel 5, such as ON/OFF of a power source and a switch of various functions, and functions that can be executed by an operation to the touch panel 5, and transmits input signals to the CPU 11.

The memory card I/F 16 is connected to various types of memory cards 17 such as a memory stick and stores various types of data such as the shot images described above in the memory card 17. Further, the memory card I/F 16 reads out the various types of data within the memory card 17 to the RAM 12, and reproduces the data by the CPU 11.

The external I/F 18 exchanges various types of data via wired or wireless connection with an external apparatus based on various standards of a USB (Universal Serial Bus), a wireless LAN (Local Area Network), and the like.

The projector 2 is, for example, a liquid crystal projector and includes a projection controller 21, a light source 22, a liquid crystal panel 23, and a projection optical system 24.

The light source 22 is an LED (Light Emitting Diode), for example, and illuminates the liquid crystal panel 23 at a brightness corresponding to an amount of a supplied current. The liquid crystal panel 23 functions as a modulation device and generates a projection image (light image) in accordance with a drive signal from the projection controller 21. The projection optical system 24 projects modulated light that is emitted from the liquid crystal panel 23. The projection controller 21 supplies control signals to the light source 22 and the liquid crystal panel 23 based on an instruction from the CPU 11.

Of course, the projector 2 is not limited to the liquid crystal projector and may be a projector of other operation system, such as a DLP (registered trademark) projector and an LCOS (Liquid Crystal On Silicon) projector.

The projector 2 projects a projection image containing an image for a user operation that will be described later onto the projection area 10 and further projects a shot image that is shot by the camera 3 and captured by the RAM 12 or an image of a subject onto the projection area 10.

The camera 3 includes an imaging controller 31, an imaging device 32, and an imaging optical system 33.

As the imaging device 32, a CCD (Charge Coupled Device) image sensor or a CMOS (Complementary Metal Oxide Semiconductor) image sensor is used. The imaging optical system 33 forms an image of a subject on an imaging surface of the imaging device 32. The imaging controller 31 drives the imaging device 32 and performs predetermined signal processing with respect to an image signal output from the imaging device 32, based on an instruction from the CPU 11.

The shot image after the signal processing is used for detecting, by the CPU 11, a user operation to a projection image. Further, the shot image is captured in a clipboard or the like of the RAM 12 based on the detected user operation, and thereafter stored in the flash memory 13 or memory card 17 as appropriate.

The display 4 is, for example, an LCD (Liquid Crystal Display) or an OELD (Organic Electro-Luminescence Display) of TFTs (Thin Film Transistors) or the like and includes the touch panel 5. The display 4 displays GUIs for touch operations or various types of data under control of the CPU 11, for example, in a case where a user performs an operation on data in the portable information apparatus 100 or various setting operations of the projector 2 and the camera 3.

The display 4 may not include the touch panel 5 and operations of the user may be input from only the key/switch portion 15.

(Operation of Portable Information Apparatus)

Next, an operation of the portable information apparatus 100 structured as described above will be described. In the following descriptions, the CPU 11 is described as a subject of operations, but the operations of the CPU 11 are executed in cooperation with a program developed in the RAM 12.

(Capture Operation of Portable Information Apparatus)

First, a capture operation of the portable information apparatus 100 will be described.

Figure 3:
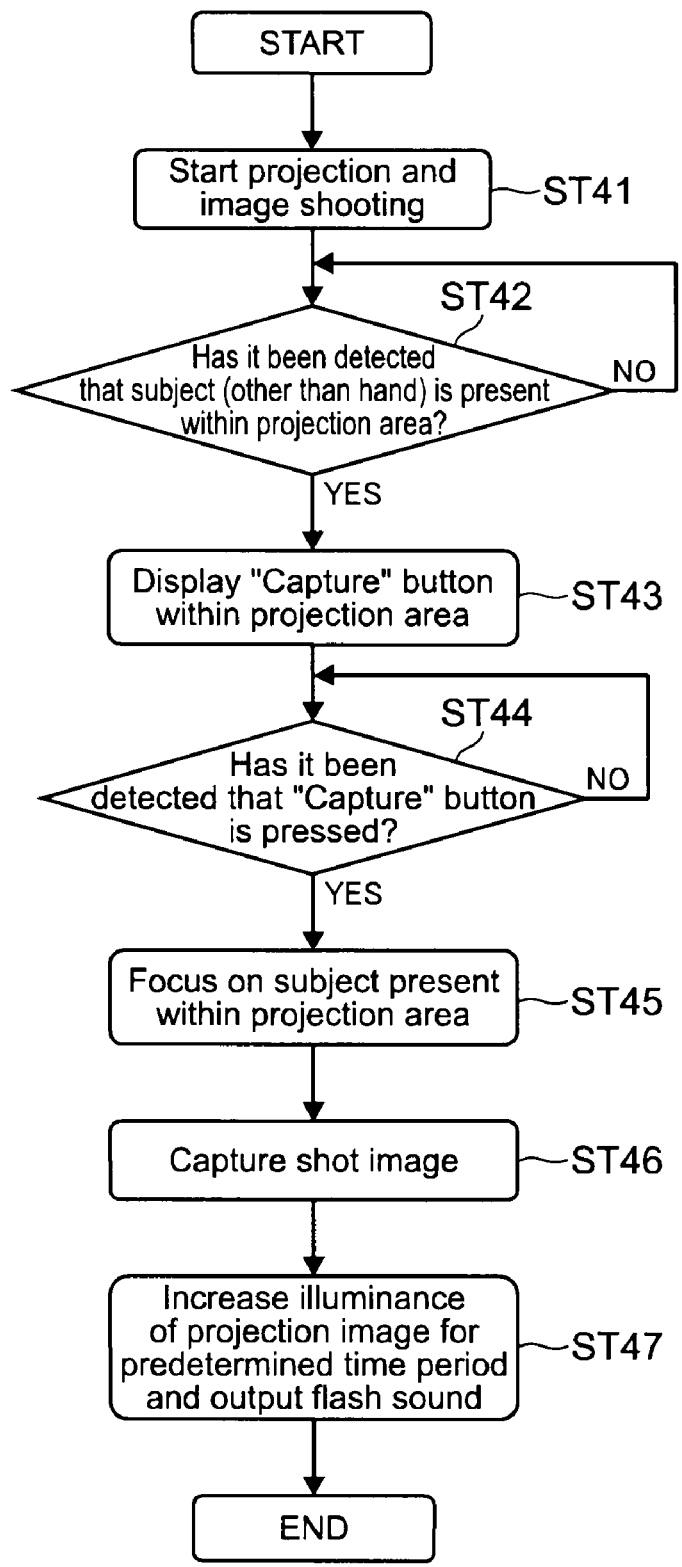
FIG. 3 is a flowchart showing a flow of an operation when the portable information apparatus according to the embodiment of the present invention captures an image shot by a camera.

FIG. 3 is a flowchart showing a flow of an operation when the portable information apparatus 100 captures an image shot by the camera 3.

As shown in FIG. 3, the CPU 11 of the portable information apparatus 100 first projects a projection image onto the projection area 10 by the projector 2 and shoots an image of the projection area 10 by the camera 3 (Step 41).

Subsequently, the CPU 11 analyzes the image shot by the camera 3 and judges whether a subject other than the hand H of the user is present within the projection area 10 (Step 42).

When the presence of the subject has been recognized (YES), the CPU 11 controls the projector 2 to project an image of a "Capture" button within the projection area 10 (Step 43).

Then, the CPU 11 judges whether the projected "Capture" button has been pressed with the finger of the user (whether the finger of the user has touched an area of the "Capture"

button within the projection area 10). This judgment is also executed by performing an image analysis on the image shot by the camera 3.

Subsequently, when detecting that the "Capture" button 50 described above has been pressed (YES), the CPU 11 controls the camera 3 to focus on the subject that is present within the projection area 10 (Step 45).

The CPU 11 then captures the focused shot image by the camera 3 (Step 46). The captured shot image is stored in, for example, the clipboard of the RAM 12.

In this case, the CPU 11 increases illuminance of the projection image of the projector 2 for a predetermined time period, for example, one second. Simultaneously, the CPU 11 outputs a flash sound of a general camera from the speaker 14 (Step 47). Through those operations, the CPU 11 artificially reproduces a flash and a flash sound of a general camera.

FIG. 4 are diagrams showing a state of the projection area 10 when the CPU 11 detects that a subject is present within the projection area 10 and projects the "Capture" button. FIG. 4 show an example in which an image of a CD jacket (CD case) is shot as a subject.

Figure 4A:
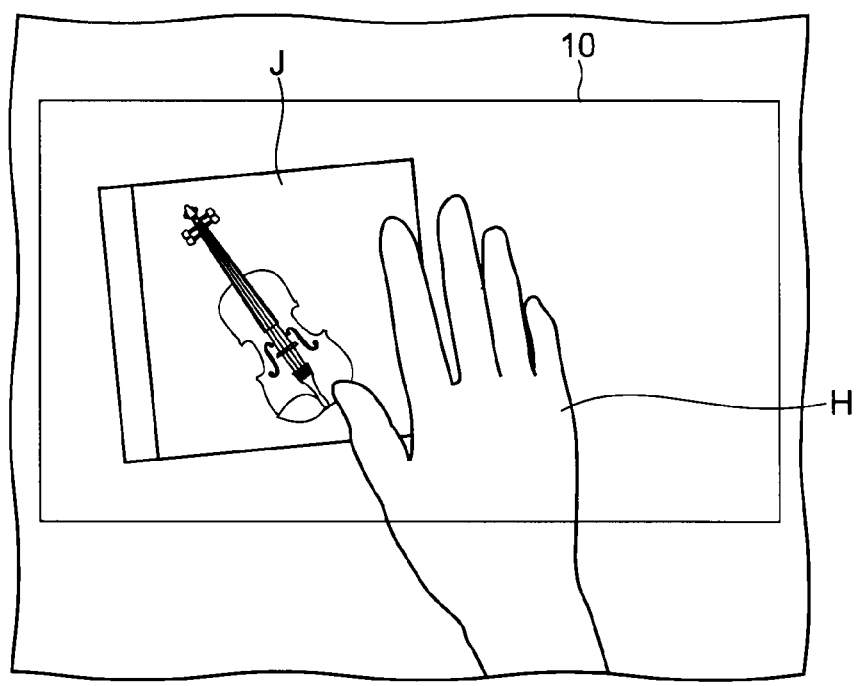
FIG. 4 are diagrams showing a state of a projection area when a CPU detects that a subject is present within a projection area and projects a "Capture" button in the embodiment of the present invention.

As shown in FIG. 4A, when a user places a CD jacket J within the projection area 10 with the hand H, the CPU 11 recognizes an image of the hand H and the CD jacket J that is shot by the camera 3. The CPU 11 pattern-matches metadata including a form of a hand, a color, and the like that is stored in advance with the shot image, and performs image analysis processing such as edge extraction, to thereby detect that an object other than the hand H is present within the projection area 10. At this time, the CPU 11 recognizes that an object is present within the projection area 10 but does not recognize the object as the CD jacket J.

Figure 4B:
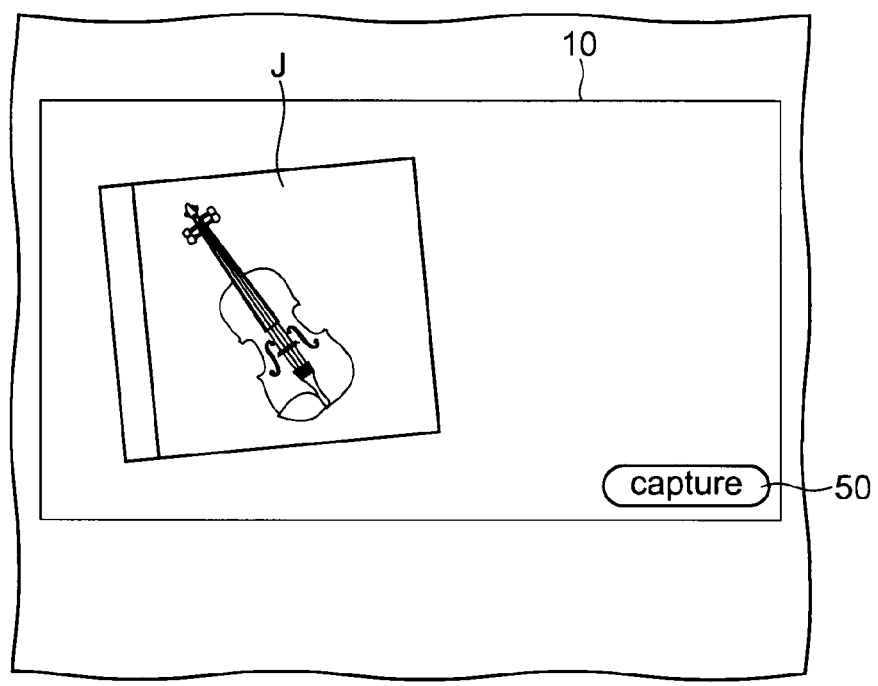

When detecting the presence of the subject, the CPU 11 controls the projector 2 to project the "Capture" button 50, for example, on a lower right portion of the projection area 10 as shown in FIG. 4B.

The "Capture" button 50 is not of course limited to the button including characters of "Capture", and may be any button, icon, or the like as long as a user can understand that the button or icon is an operation image used for executing the capture operation.

FIG. 5 are diagrams showing a state of the projection area 10 when the CPU 11 detects that the "Capture" button 50 has been pressed and captures the shot image.

Figure 5A:
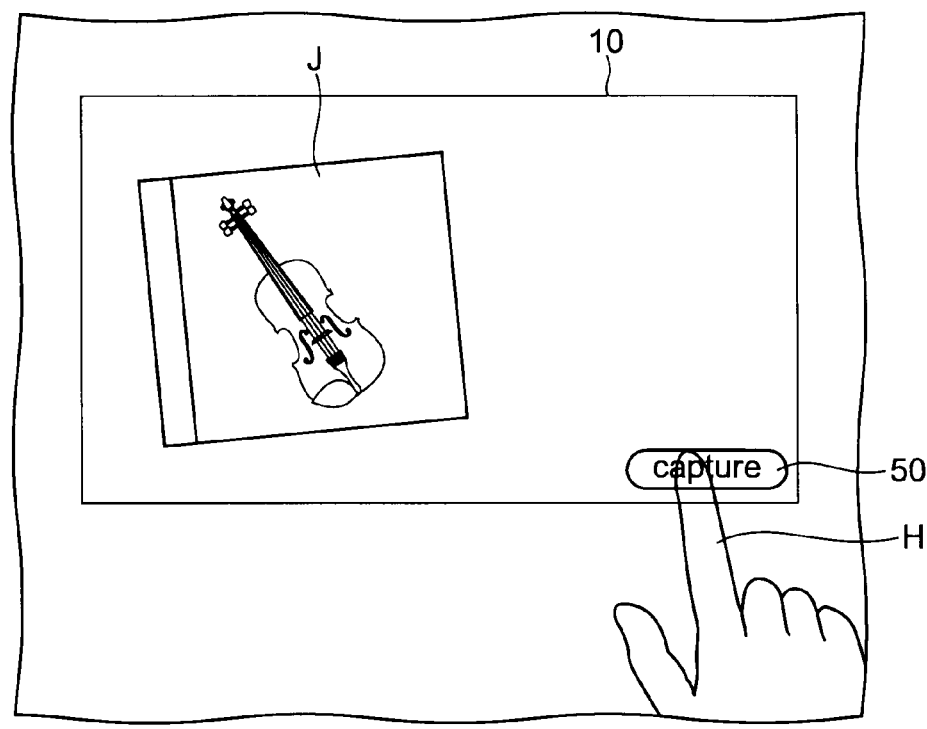
FIG. 5 are diagrams showing a state of the projection area when the CPU detects that the "Capture" button has been pressed and captures a shot image in the embodiment of the present invention.

As shown in FIG. 5A, by recognizing, based on the image shot by the camera 3, that the shot image around the "Capture" button 50 is changed, the CPU 11 detects that the user has pressed the "Capture" button 50 with the finger or the like.

Figure 5B:
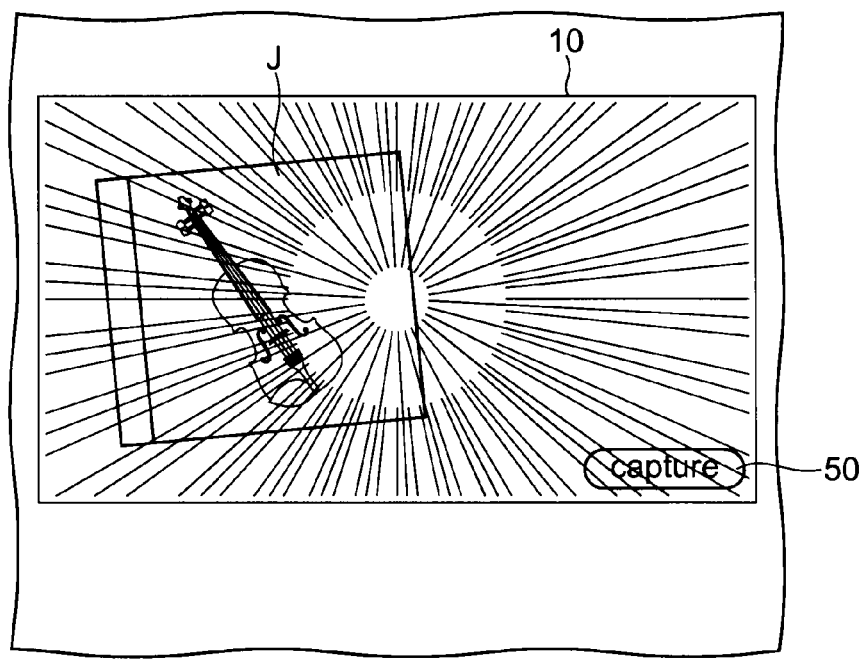

When detecting that the "Capture" button 50 has been pressed, the CPU 11 captures the shot image by the camera 3 after a predetermined time period, for example, one second since that detection. Simultaneously, the CPU 11 controls the projector 2 to increase illuminance of the projection image as shown in FIG. 5B. Accordingly, a flash of a general camera is visually reproduced. Together with the flash, the CPU 11 outputs a sound imitating a flash sound from the speaker 14.

A plurality of subjects may exist within the projection area 10.

FIG. 6 are diagrams showing a state of the projection area 10 when the CPU 11 detects that a plurality of subjects are present within the projection area 10 and projects the "Capture" button 50. FIG. 7 are diagrams showing a state of the projection area 10 when the CPU 11 detects that the "Capture" button 50 has been pressed and captures a shot image in the case where the plurality of subjects are present within the projection area 10. Those figures show an example in which an image of a plurality of business cards as the subjects is shot.

Figure 6A:
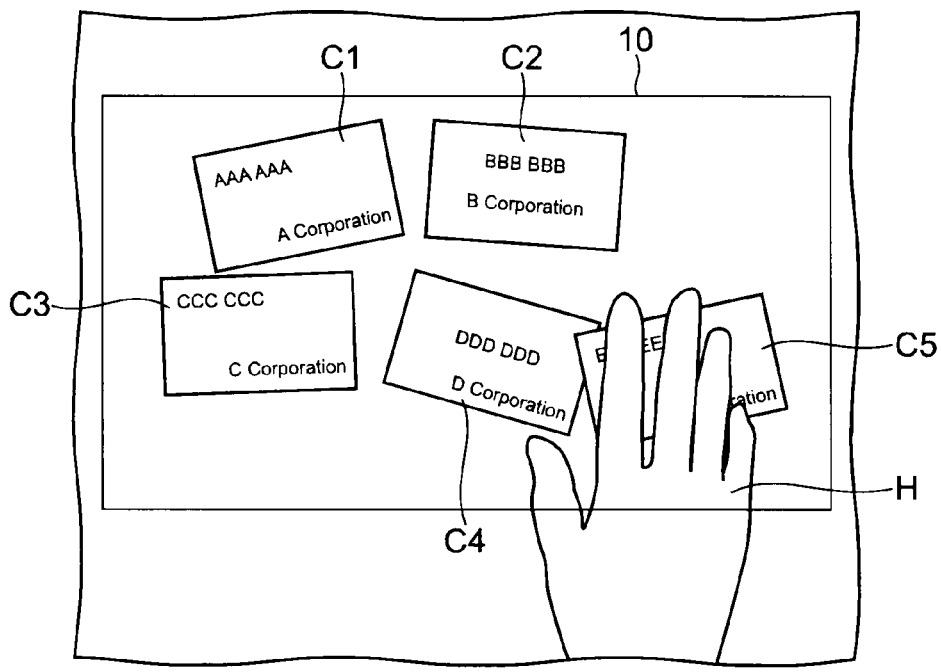
FIG. 6 are diagrams showing a state of the projection area when the CPU detects that a plurality of subjects are present within the projection area and projects the "Capture" button in the embodiment of the present invention.
Figure 6B:
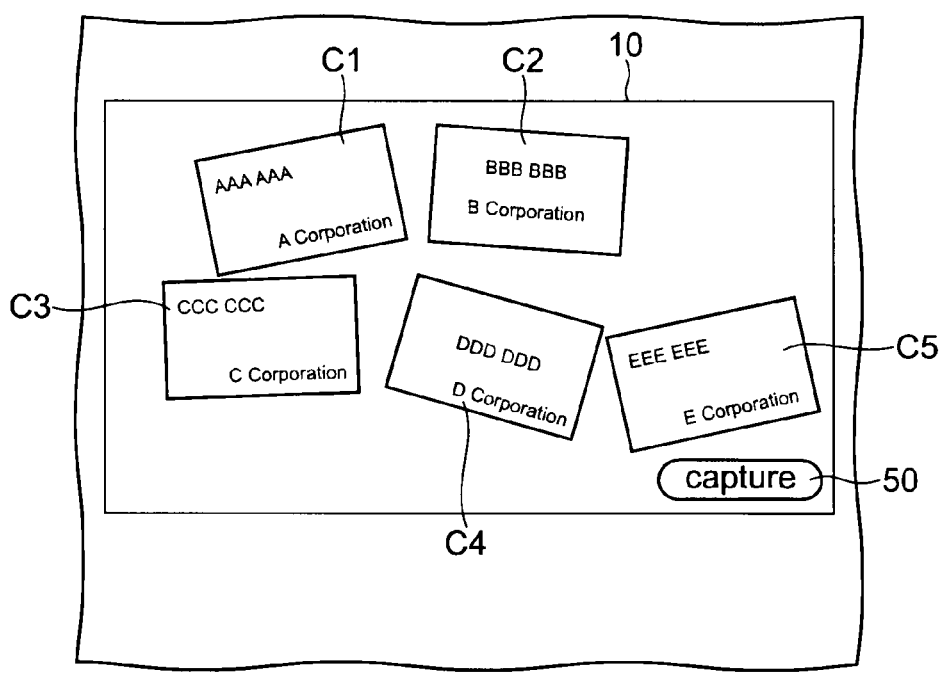

As shown in FIG. 6A, for example, when the user places business cards C1 to C5 within the projection area 10 with the hand H, the CPU 11 recognizes an image of the hand H and the business cards C1 to C5 that is shot by the camera 3. The CPU 11 performs the image analysis processing or the like as in the case of FIG. 4. When detecting that a plurality of objects other than the hand H are present within the projection area 10, the CPU 11 projects the "Capture" button 50 by the projector 2 as shown in FIG. 6B.

Figure 7A:
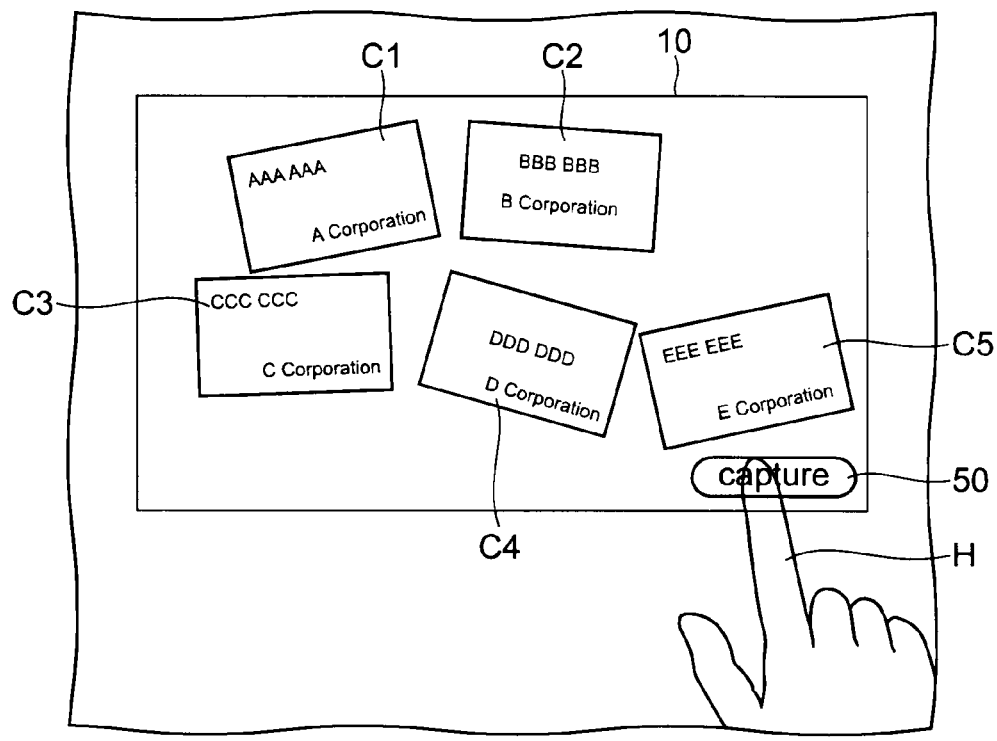
FIG. 7 are diagrams showing a state of the projection area when the CPU detects that the "Capture" button has been pressed and captures a shot image in a case where the plurality of subjects are present within the projection area in the embodiment of the present invention.
Figure 7B:
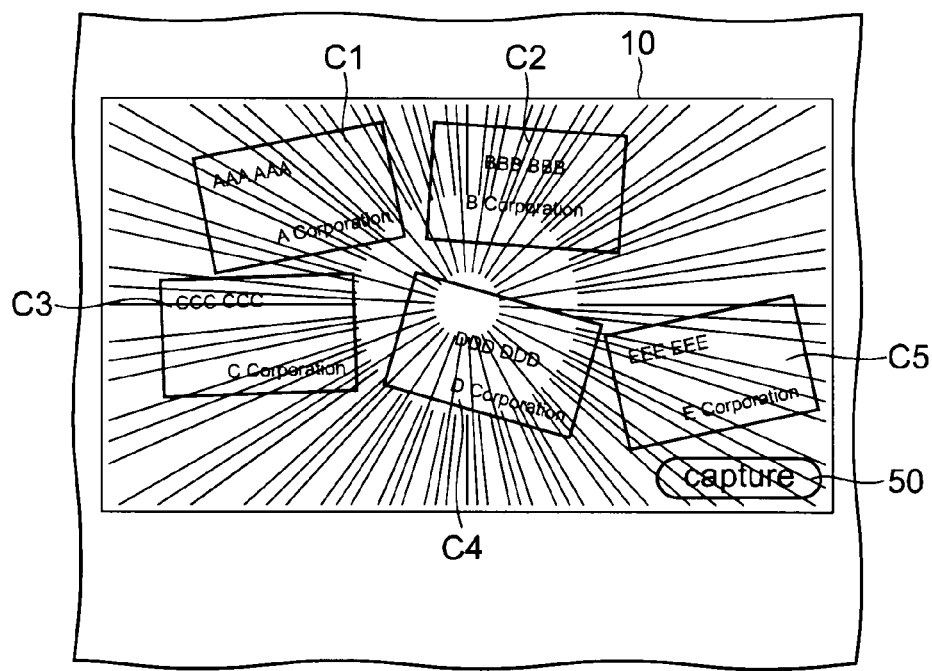

As shown in FIG. 7A, when the CPU 11 detects, based on the image shot by the camera 3, that the "Capture" button 50 has been pressed by the user as in the case of FIG. 5, the CPU 11 captures the shot image by the camera 3. Simultaneously, the CPU 11 increases illuminance of the projection image by the projector 2 for a predetermined time period and outputs a flash sound from the speaker 14.

(Storage Operation for Metadata of Subject by Portable Information Apparatus)

Next, an operation of storing metadata of a subject by the portable information apparatus 100 will be described.

Figure 8:
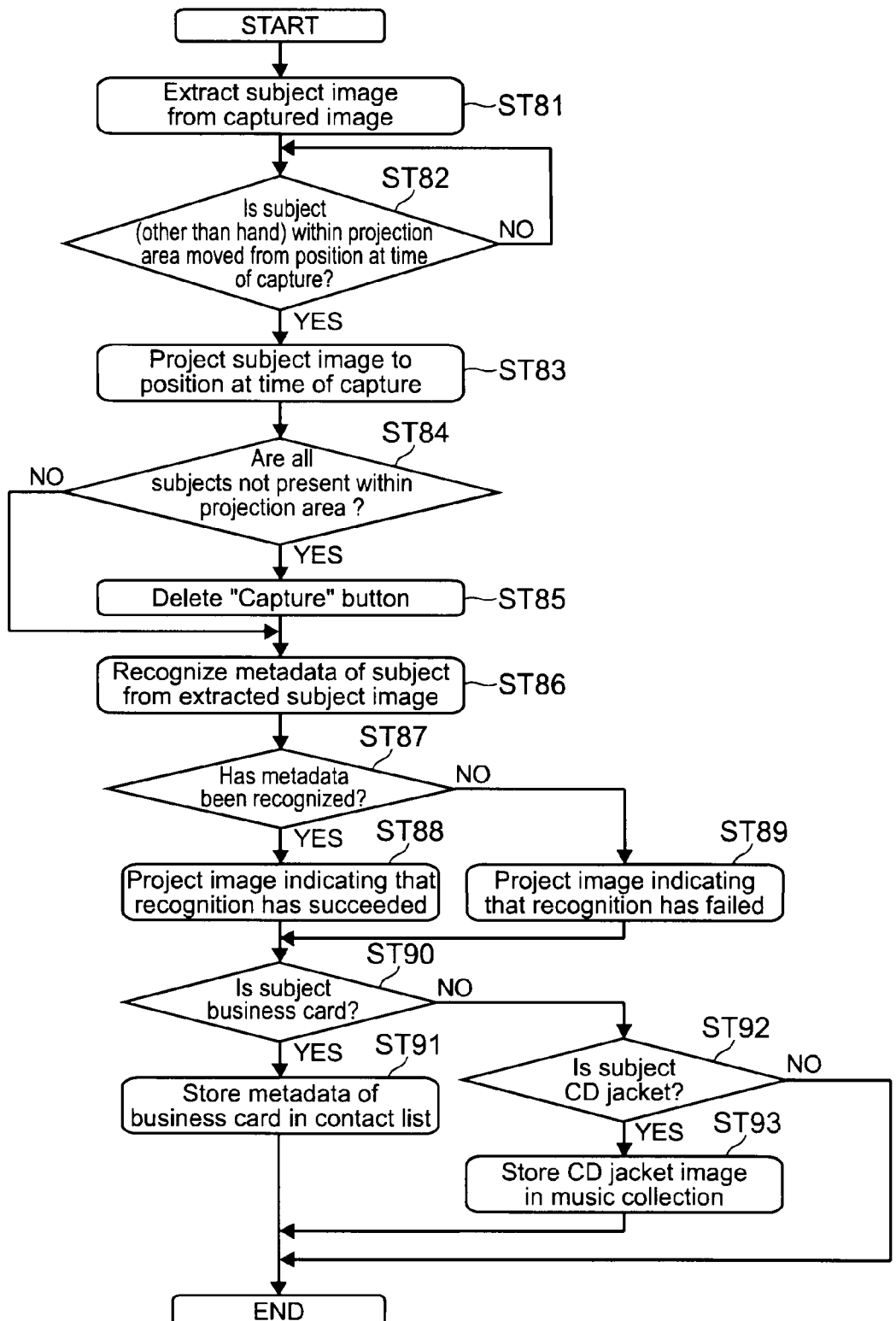
FIG. 8 is a flowchart showing a flow of an operation when the portable information apparatus according to the embodiment of the present invention stores an image of a subject and metadata of the subject.

FIG. 8 is a flowchart showing a flow of an operation when the portable information apparatus 100 stores metadata of a subject.

As shown in FIG. 8, after the shot image is captured, the CPU 11 performs the image analysis processing such as edge extraction on the captured image and extracts an image in an area of the subject (Step 81). Hereinafter, the extracted image in the area of the subject is referred to as a subject image. The subject image is temporarily stored in, for example, the RAM 12.

Subsequently, the CPU 11 judges whether the subject other than the hand H within the projection area 10 is moved from a position where the shot image has been captured. This judgment is performed by, for example, comparing the shot image by the camera 3 at a time when the shot image has been captured and that after an elapse of a predetermined time period and taking a difference therebetween.

When judging that the subject has been moved (YES), the CPU 11 controls the projector 2 to project the subject image to the position where the subject has been present at the time of the capture (Step 83).

FIG. 9 are diagrams showing a state where that subject image is projected.

Figure 9A:
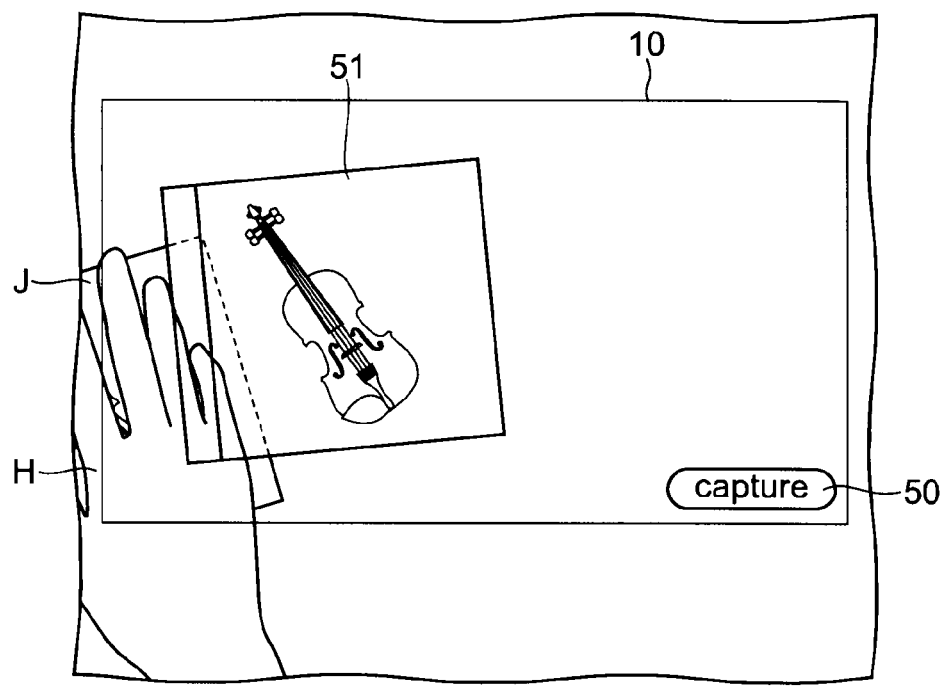
FIG. 9 are diagrams showing a state where a subject image is projected after the capture in the embodiment of the present invention.

FIG. 9A shows a state of projection in a case where the CD jacket J is the subject. When detecting that the user has moved the CD jacket J with the hand H from a position at a time of the capture, the CPU 11 projects a CD jacket image 51 that is obtained by extracting the area of the CD jacket J from the captured image, to the position where the image of the CD jacket J has been captured.

Figure 9B:
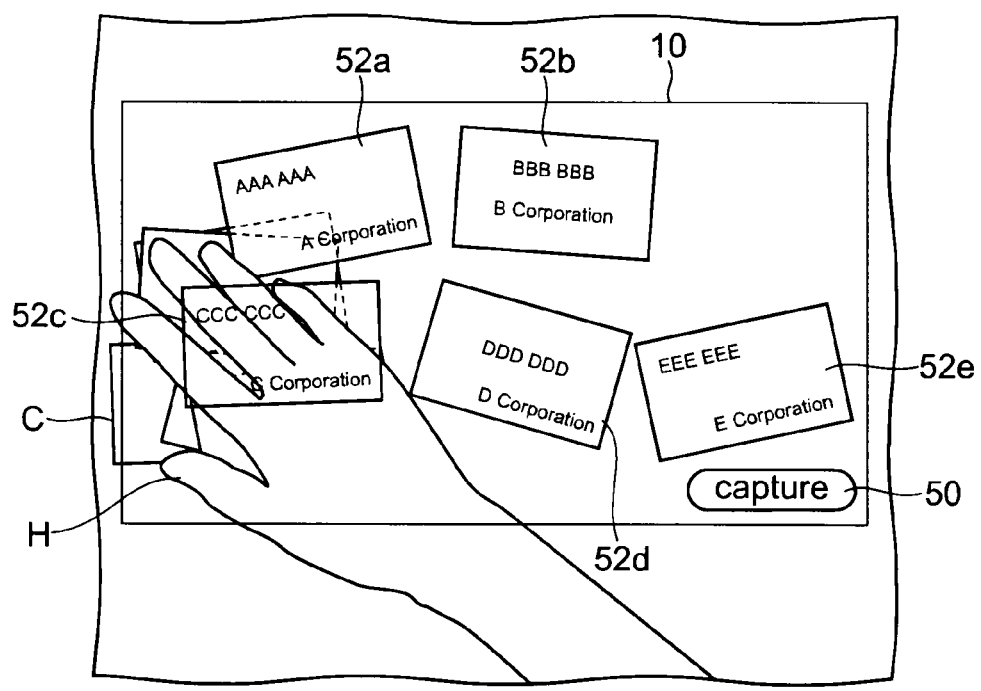

FIG. 9B shows a state of projection in a case where the plurality of business cards C1 to C5 are the subjects. When detecting that the user has moved the business cards C1 to C5 with the hand H from positions at a time of the capture, the CPU 11 projects a plurality of business card images 52*a* to 52*e* that are obtained by extracting areas of the business cards C1 to C5 from the captured image, to the positions where the images of the business cards C1 to C5 have been captured.

Through the processing shown in FIGS. 9A and 9B, the user can easily grasp that the subject has been captured.

Referring back to FIG. 8, the CPU 11 subsequently judges whether all subjects within the projection area 10 have been moved out of the projection area 10 (are not present) (Step 84). This judgment is also performed by analyzing the image shot by the camera 3.

When judging that all subjects have been moved out of the projection area 10 (YES), the CPU 11 controls the projector 2 to delete the "Capture" button 50 from the projected image (Step 85). The processing in Steps 84 and 85 are also executed as needed during execution of processing in subsequent steps.

Subsequently, the CPU 11 recognizes metadata of the subject from the extracted subject image (Step 86). Here, the metadata is data associated with the subject, such as data including an identity of the subject (what the subject is) and characters contained in the subject. The recognition of the metadata is executed using an image recognition technology such as pattern matching and feature recognition. When the subject is a copyrighted work, copyright information (author's name, name of copyrighted work) may be recognized as metadata. For that recognition, a character recognition technology such as an OCR may be used in addition to the image recognition technology. Further, the portable information apparatus 100 may include a communication means for transmitting the subject image to a search engine on a network and acquiring corresponding copyright information.

Subsequently, the CPU 11 controls the projector 2 to project an image indicating that the recognition has succeeded when the metadata has been recognized from the subject (YES), and project an image indicating that the recognition has failed when the metadata has not been recognized (NO) (Steps 88 and 89).

FIG. 10 are diagrams showing a state where an image indicating that the recognition of the metadata has succeeded or failed (hereinafter, referred to as recognition result display image) is projected.

Figure 10A:
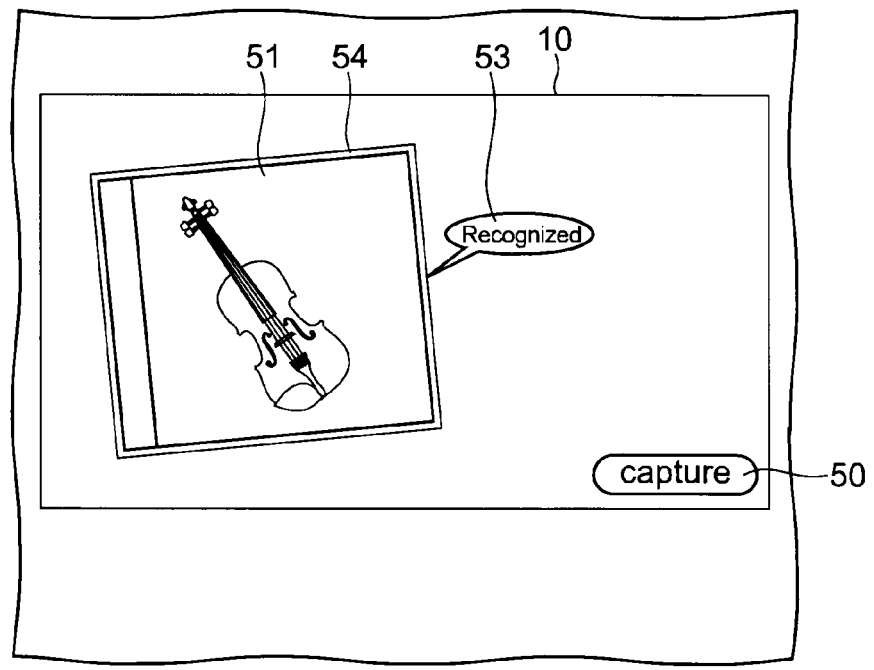
FIG. 10 are diagrams showing a state where a recognition result display image of the metadata is projected in the embodiment of the present invention.

FIG. 10A shows a state of projection in a case where the subject is the CD jacket J. In a case where the CPU 11 has succeeded in recognizing metadata of the CD jacket J (identity of CD jacket), the CPU 11 projects characters of "Recognized" as a recognition result display image 53 by, for example, a balloon or a pop-up in the vicinity of the CD jacket image 51. Further, the CPU 11 controls the projector 2 to project a frame 54 indicating a metadata recognition target around the CD jacket image 51.

Figure 10B:
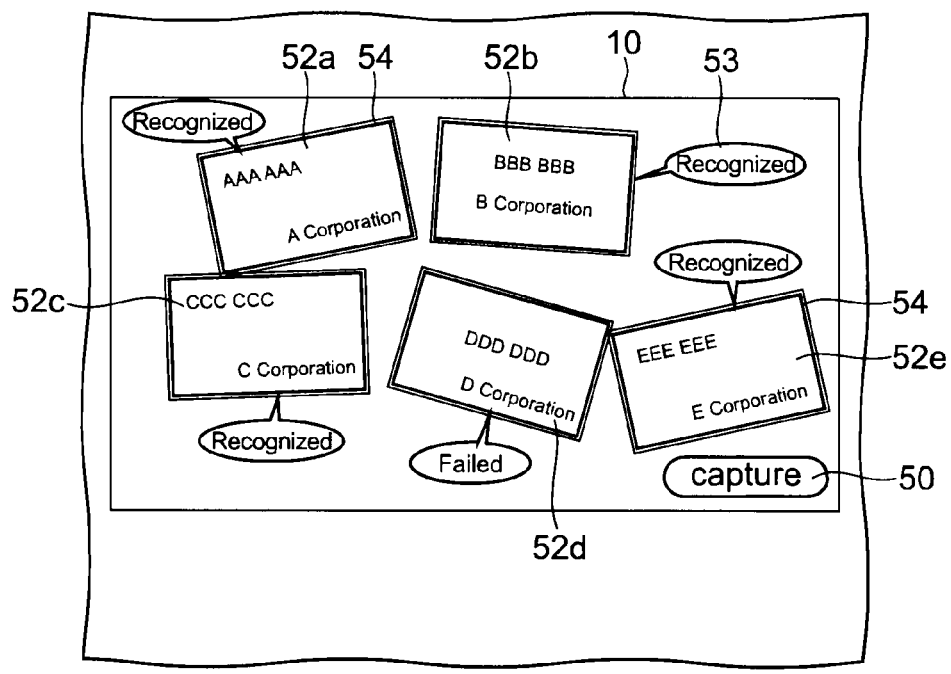

FIG. 10B shows a state of projection in a case where the subjects are the plurality of business cards C1 to C5. In a case where the CPU 11 has succeeded in recognizing metadata of the business cards C1 to C5 (for example, characters described in business cards), the CPU 11 projects characters of "Recognized" as the recognition result display image 53 in the vicinity of the business card images 52, and in a case where the CPU 11 has failed, the CPU 11 also projects characters of "Failed" by the projector 2. The frame 54 is also projected around each of the business card images 52. FIG. 10B shows an example in which recognition of characters in the business cards C1, C2, C3, and C5 corresponding to the business card images 52a, 52b, 52c, and 52e has succeeded and recognition of characters in the business card C4 corresponding to the business card image 52d has failed.

Accordingly, the user can easily grasp a recognition result of the metadata. Further, as to the business card whose metadata has not been recognized, when the user places a business card corresponding to that business card image in the projection area 10 so that an image of the business card is captured again, the metadata can be correctively recognized.

Of course, the display for indicating the recognition result of metadata is not limited to the characters of "Recognized" and "Failed" described above, and any display may be made as long as the user can grasp a recognition result.

Referring back to FIG. 8, the CPU 11 subsequently judges whether the subject as a metadata recognition target is a business card (Step 90). When judging that the subject is a business card (YES), the CPU 11 stores metadata of the business card, as a part of a contact list, in the flash memory 13 or the like (Step 91). In a case where there are a plurality of business cards, metadata of the respective business cards are stored at a time.

Here, the contact list is made by listing character information including a name, a company name, an address, a telephone number, an e-mail address, and the like that are recognized from a business card for each person. In a case where the character information of a business card is stored in the contact list, the CPU 11 controls the projector 2 to project an animation indicating that storing state.

FIG. 11 are diagrams showing an animation when the character information of the business card is stored in the contact list. This animation is projected as a series of processing from the capture operation and the projection operation of the metadata recognition result. Further, in FIG. 11, description is made assuming that the CPU 11 has succeeded in the recognition of the character information on all the business cards C1 to C5.

Figure 11A:
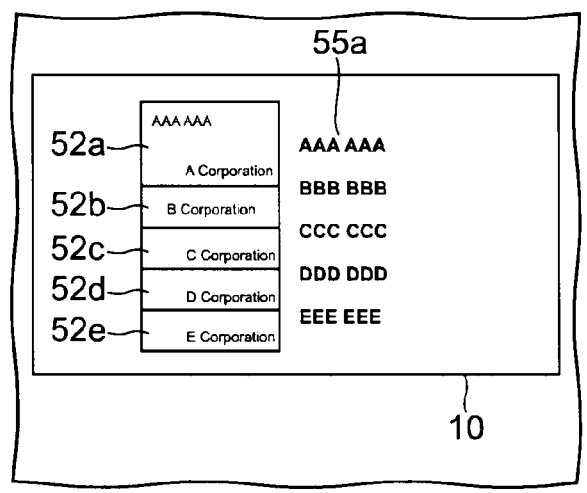
FIG. 11 are diagrams showing an animation projected when character information of a business card is stored in a contact list in the embodiment of the present invention.

As shown in FIG. 11A, the CPU 11 controls the projector 2 to arrange the business card images 52a to 52e, for example, in a vertical direction and project names 55 (55a to 55e) that are recognized as character information next to the business card images 52a to 52e.

Figure 11B:
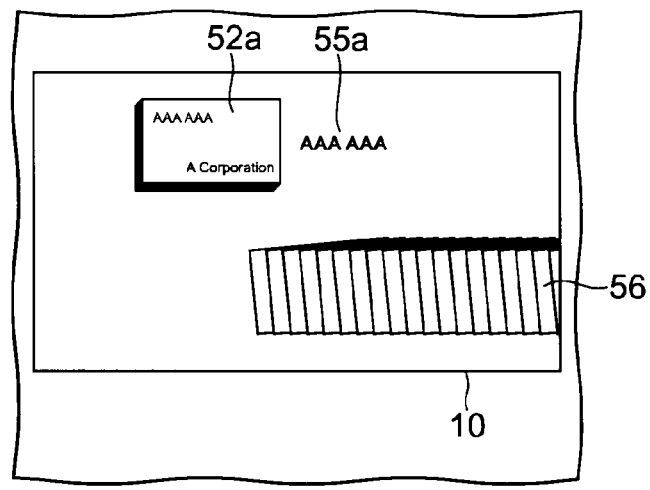
Figure 11C:
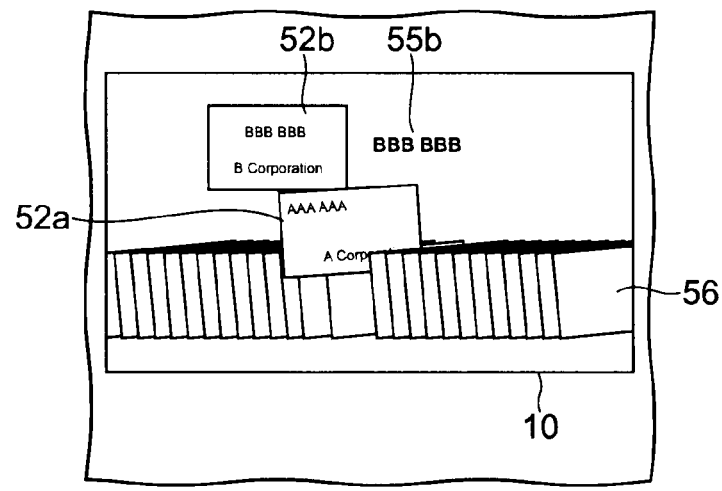

As shown in FIGS. 11B and 11C, the CPU 11 projects an animation in which the business card images 52a to 52e are superimposed, for example, in an alphabetical order of the names, and each sequentially filed in an appropriate position of a row 56 constituted of other business cards that have already been stored in the contact list in the alphabetical order.

Here, together with the character information, the business card images 52a to 52e themselves may also be stored in the contact list.

Through the animation as described above, the portable information apparatus 100 can help a user easily grasp that the business cards C1 to C5 are stored as a part of the contact list and increase interests of the user.

Further, since the character information of the plurality of business cards are recognized and stored at a time, it is possible to make the processing of the CPU 11 efficient and save time and effort of the user, as compared to a case where the storage processing is executed for each of the business cards.

Referring back to FIG. 8, when the CPU 11 judges that the subject is not a business card (NO), the CPU 11 judges whether the subject is a CD jacket (Step 92). When judging that the subject is a CD jacket (YES), the CPU 11 causes the flash memory 13 or the like to store metadata of the CD jacket as a part of a music collection.

Here, the music collection is for storing the CD jacket image 51 itself as a photo collection. However, based on the CD jacket image 51, the CPU 11 may recognize a name of an album, an artist's name, and the like corresponding to the CD jacket image 51 as metadata, and store them in the music collection together with the CD jacket image 51.

Moreover, the CPU 11 may download music data corresponding to the CD jacket J whose metadata has been recognized or music data associated therewith from the Internet, for example. In addition, in a case where the portable information apparatus 100 is connected to an external apparatus and the music data is stored in the external apparatus, the CPU 11 may make an arrangement for transmitting the music data from the external apparatus to the portable information apparatus 100 via, for example, the external I/F 18.

When judging that the subject is not a business card or CD jacket (NO), the CPU 11 terminates the processing. However, in a case where the portable information apparatus 100 also includes an application for recognizing metadata from a subject other than the business card and the CD jacket and storing it, processing corresponding thereto is executed.

Further, in executing the processing described above, an application for recognizing metadata from a business card and an application for recognizing metadata from a CD jacket may exist separately or exist as functions of one application.

In a case where it is detected that a subject is present within the projection area 10, the "Capture" button 50 deleted in Step 85 described above is projected again by the processing described in Step 42 and subsequent steps in FIG. 3.

By the processing described above, the portable information apparatus 100 can capture an image of a subject when an operation to the "Capture" button 50 contained in a projection image is detected. Further, the portable information apparatus 100 can recognize metadata from a subject image and store it with absence of all subjects within the projection area 10 being used as a trigger. Accordingly, the user can cause an image of a desired subject to be easily and intuitionally captured by only an operation to a projection image without touching the portable information apparatus 100 itself, and metadata to be recognized and stored. Moreover, by placing a desired subject within the projection area 10 and pressing the "Capture" button 50, the user can use the portable information apparatus 100 as a large-size pseudo-camera in which the projection area 10 is assumed as a viewfinder and the "Capture" button 50 is assumed as a shutter button.

MODIFIED EXAMPLES

The present invention is not limited to only the embodiment described above and can be variously modified without departing from the gist of the present invention.

In the embodiment described above, the CPU 11 recognizes metadata from a subject image and stores it with the absence of all subjects within the projection area 10 (movement out of the projection area 10) being used as a trigger. However, the CPU 11 may cause the user to judge whether the recognized metadata is stored and store metadata based on an operation of the user.

For example, the CPU 11 may control the projector 2 so that an image of button for performing an operation for an instruction to store metadata is contained in a projection image.

Figure 12:
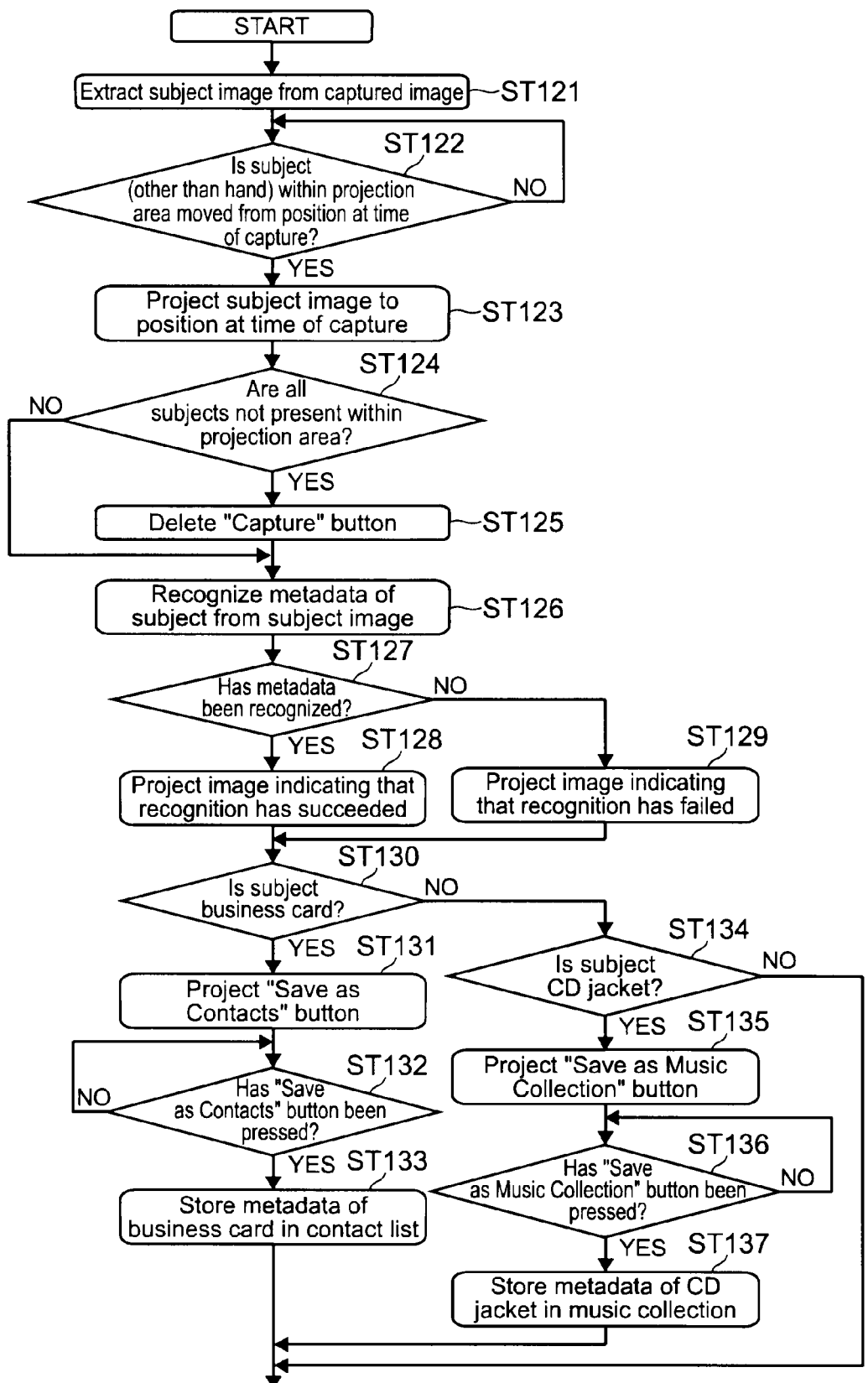
FIG. 12 is a flowchart showing a flow of an operation of the portable information apparatus in a case where the metadata is stored based on a user operation to a button in another embodiment of the present invention.

FIG. 12 is a flowchart showing a flow of an operation of the portable information apparatus 100 in a case where the metadata is stored based on a user operation to an image of a button.

As shown in FIG. 12, the CPU 11 executes processing of Steps 121 to 129 that are the same as in Steps 81 to 89 in FIG. 8 described above.

Subsequently, in a case where the CPU 11 judges that the subject is a business card (YES of Step 130), the CPU 11 controls the projector 2 so that a projection image includes a "Save as Contacts" button (Step 131).

Then, the CPU 11 judges whether the user has pressed the "Save as Contacts" button with the finger or the like based on the image shot by the camera 3 (Step 132).

When judging that the "Save as Contacts" button has been pressed (YES), the CPU 11 stores the metadata in the contact list as in the embodiment described above (Step 133).

Further, when judging that the subject is a CD jacket (YES of Step 134), the CPU 11 controls the projector 2 so that a projection image includes a "Save as Music Collection" button (Step 135).

Next, the CPU 11 judges whether the user has pressed the "Save as Music Collection" button with the finger or the like based on the image shot by the camera 3 (Step 136).

Then, when judging that the "Save as Music Collection" button has been pressed (YES), the CPU 11 stores the CD jacket image 51 in the music collection as in the embodiment described above (Step 137).

Those "Save as Contacts" button and "Save as Music Collection" button are of course not limited to the buttons including those characters. That is, any button, icon, or the like may be projected as long as a user can understand that the button or the like is an operation image used for executing processing of storing metadata of respective subjects.

FIG. 13 are diagrams showing a state where the "Save as Music Collection" button and the "Save as Contacts" button are projected within the projection area 10.

Figure 13A:
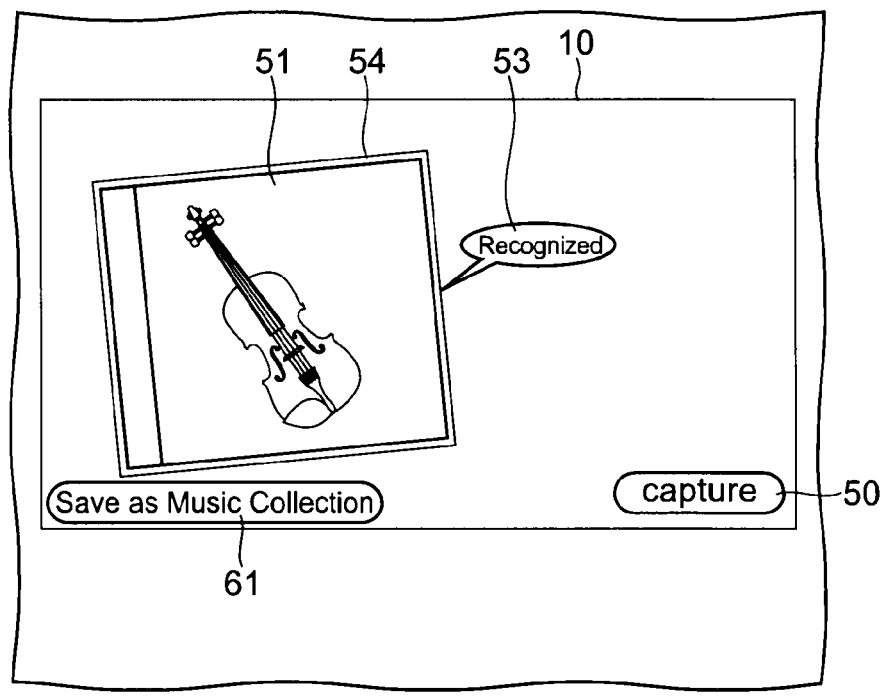
FIG. 13 are diagrams showing a state where a button for storing the metadata is projected within the projection area in the another embodiment of the present invention.

FIG. 13A shows an example of a case where the subject is the CD jacket J. When judging that the subject is a CD jacket, the CPU 11 controls the projector 2 to project a "Save as Music Collection" button 61 in a mode clearly distinguishable from the "Capture" button 50 in the vicinity of the CD jacket image 51, for example.

In a case where the CPU 11 detects that the user has pressed the "Save as Music Collection" button 61, the CPU 11 executes processing of storing the CD jacket image 51.

Figure 13B:
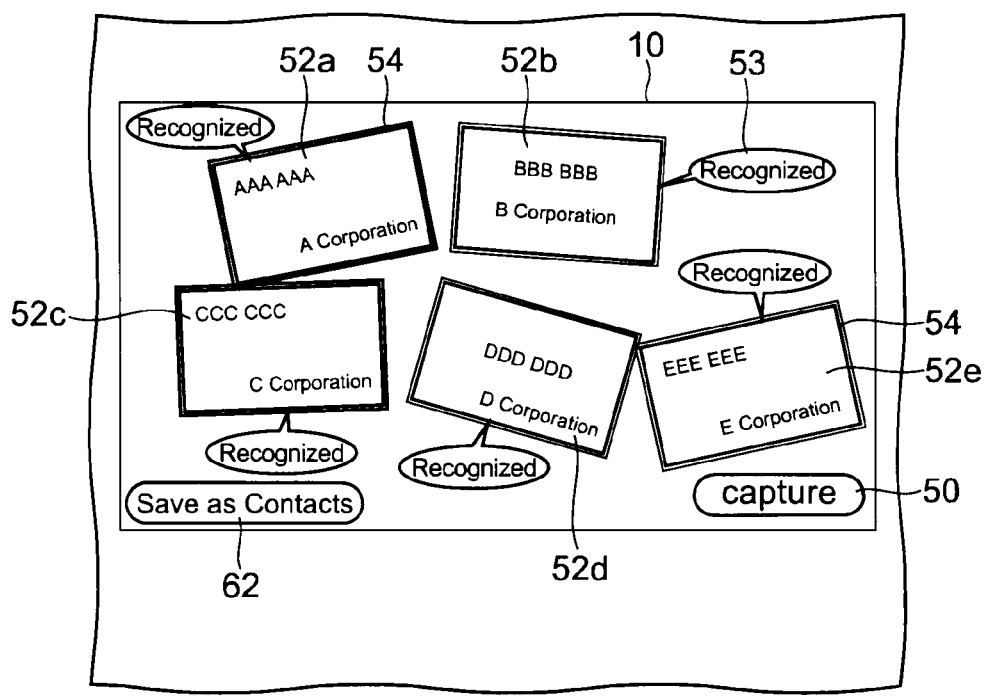

FIG. 13B shows an example of a case where the subjects are the plurality of business cards C1 to C5. When recognizing character information on each of all the business cards C1 to C5 and judging that the subjects are business cards, the CPU 11 controls the projector 2 to project a "Save as Contacts" button 62.

In FIG. 13B, only one "Save as Contacts" button 62 is projected for the business card images 52*a* to 52*e* corresponding to the plurality of business cards C1 to C5, but the "Save as Contacts" button 62 may be projected for each business card image. In this case, it is not always necessary to succeed in recognition of character information for all the business cards, and a "Save as Contacts" button may be displayed for only business cards whose recognition of character information has succeeded.

When detecting that the user has pressed the "Save as Contacts" button 62, the CPU 11 stores the plurality of business card images 52*a* to 52*e* at a time.

Through the processing described above, the portable information apparatus 100 can judge, after the recognition of metadata, whether the metadata and a subject image are stored in a list such as the contact list and the music collection based on a user operation to a projection image and execute it. Accordingly, the user can positively determine whether to store metadata of a subject and a subject image in a list through an easy operation.

In the embodiment described above, the case where the CD jacket is present as a subject within the projection area 10 and the case where the business card is present within the projection area 10 have been separately described. However, in a case where different types of subjects as described above are present within the projection area 10 at the same time, the CPU 11 may separately execute the capture processing and the metadata recognition/storage processing for each subject.

FIG. 14 are diagrams showing a state in a case where different types of subjects are present within the projection area 10 at the same time as described above.

Figure 14A:
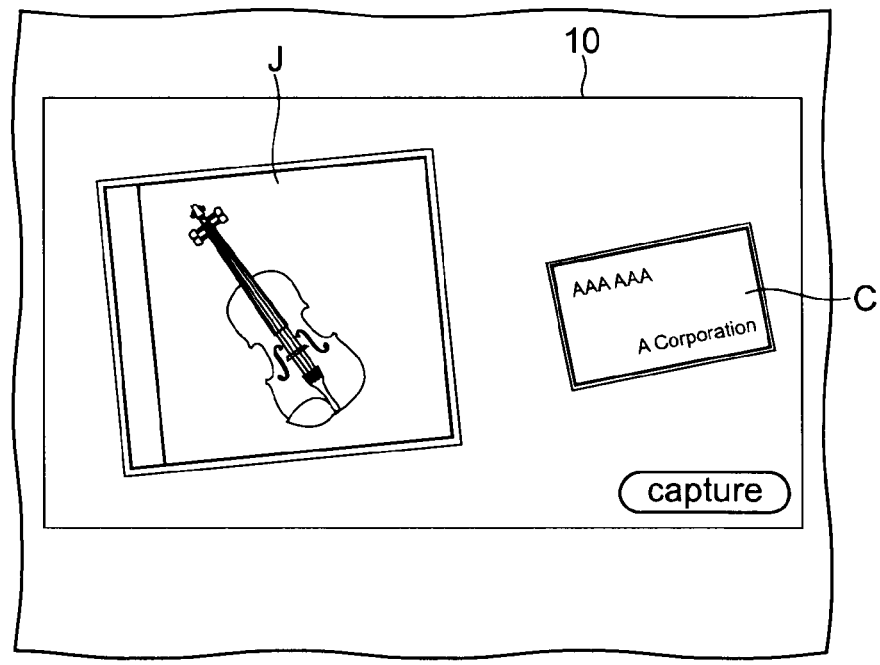
FIG. 14 are diagrams showing an example in which different types of subjects within the projection area are each captured and metadata thereof are stored in the another embodiment of the present invention.

As shown in FIG. 14A, in a case where the CPU 11 recognizes that different types of subjects (CD jacket J and business card C) are present within the projection area 10, the CPU 11 causes the projector 2 to project the "Capture" button 50 for capturing an image shot by the camera 3, the image including both the CD jacket J and business card C.

Figure 14B:
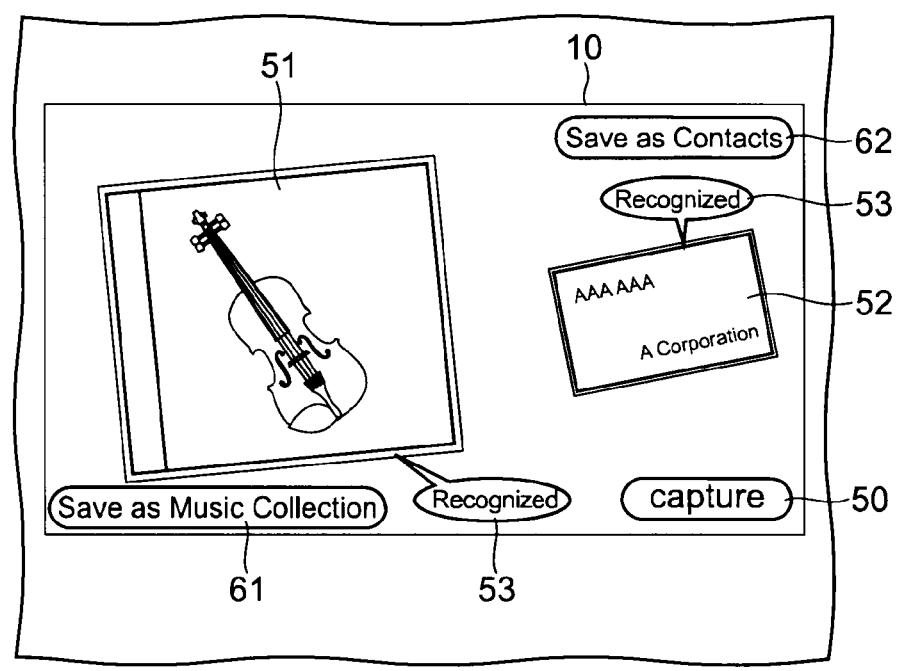

In a case where the CPU 11 detects that the "Capture" button 50 has been pressed, the CPU 11 captures the projection image and extracts the CD jacket image 51 and the business card image 52 from the captured image as shown in FIG. 14B.

Subsequently, the CPU 11 causes the projector 2 to project the "Save as Music Collection" button 61 and the "Save as Contacts" button 62, following the recognition result display image 53. Then, in accordance with user operations to those buttons, the CPU 11 stores character information of the business card C in the contact list and stores the CD jacket image 51 in the music collection.

In addition, in a case where the "Save as Music Collection" button 61 and the "Save as Contacts" button 62 are not projected, the CPU 11 executes the storage processing each time the CD jacket J or the business card C within the projection area 10 is moved out of the projection area 10.

Through the above processing, by only placing the different types of subjects in the projection area 10 at a time and performing an operation to the projection image, the user can cause metadata or the like of the different types of subjects to be easily stored in the respective lists.

In the embodiment described above, the projection area 10 of the projector 2 and the imaging area of the camera 3 coincide with each other. However, the projection area 10 and the imaging area may not coincide.

Figure 15:
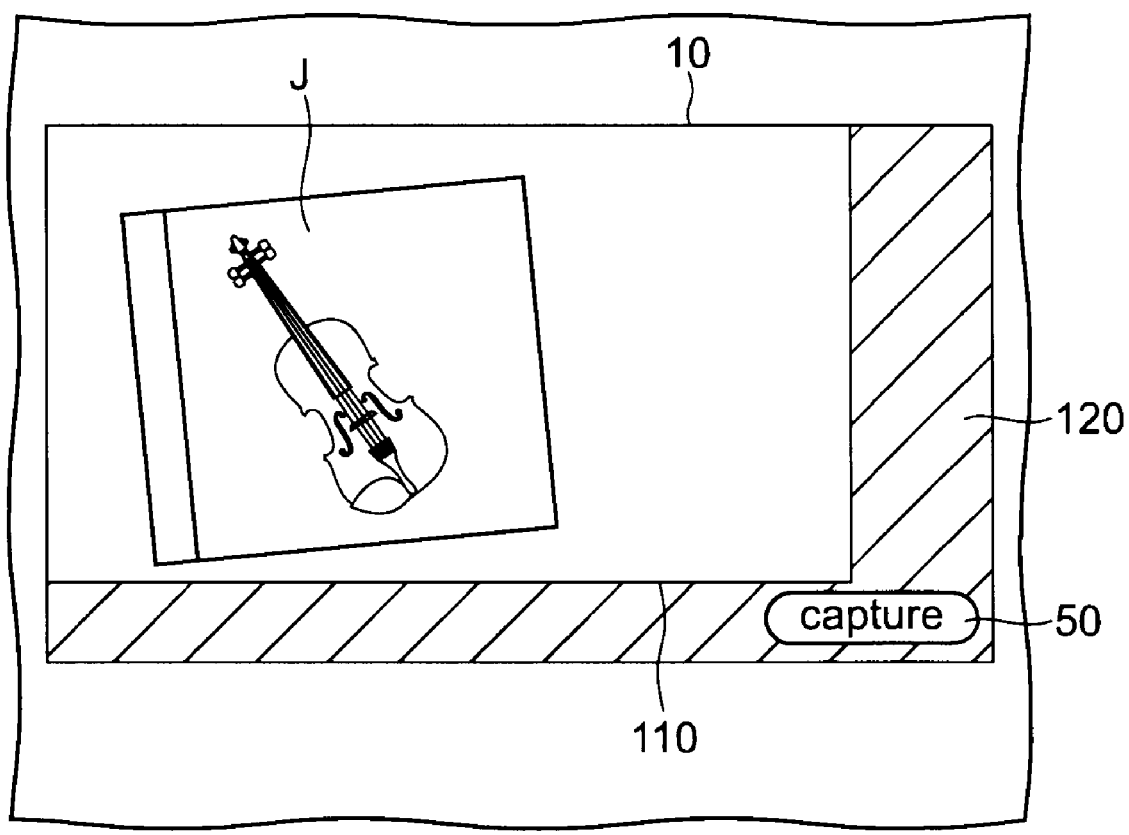
FIG. 15 is a diagram showing an example of a projection image in a case where the projection area and an imaging area do not coincide in the another embodiment of the present invention.

FIG. 15 is a diagram showing an example of the projection image in this case.

As shown in FIG. 15, an imaging area 110 is provided in the projection area 10 as a part thereof. The "Capture" button 50 is projected in a non-imaging area 120 obtained by excluding the imaging area 110 from the projection area 10.

Accordingly, it is possible to prevent the "Capture" button 50 or the finger of the user that presses the "Capture" button 50 from being captured, with the result that the user can cause the portable information apparatus 100 to store a captured image in which unnecessary objects other than a desired subject are not shown.

In the embodiment described above, the CPU 11 controls the projector 2 to increase illuminance of the projection image and controls the speaker 14 to output a flash sound at a time of capture. However, instead of such processing, the CPU 11 may cause the projector 2 to project an icon or a text indicating that the capture has been made.

In the embodiment described above, the capture processing is executed when the "Capture" button 50 is pressed. However, the trigger of the capture processing is not limited to the press of the "Capture" button 50. The portable information apparatus 100 may execute the capture processing when recognizing a voice of the user that instructs capture, such as "Capture". In this case, the "Capture" button 50 may not be displayed.

In the embodiment described above, as shown in FIG. 11, the state where the metadata (for example, character information) recognized from the captured image of the subject such as a business card (subject image) is stored in the predetermined list (contact list) is displayed as an animation. Here, in a case where the subject as a target of character recognition contains character strings of a plurality of items (for example, name, company name, address, etc.), there may be a case where the item of each character string and the character string to be recognized do not correspond, in addition to a case where characters themselves to be recognized are wrong. For example, there may be a case where a character string to be recognized as a company name is erroneously recognized as a name. When such wrong character recognition is made, a list to be stored is also wrong, which generates inconvenience.

In this regard, the portable information apparatus 100 may correct such wrong character string based on an operation input by the user during the execution of the animation.

FIG. 16 are diagrams showing a state where wrong characters are corrected during execution of the animation.

Figure 16A:
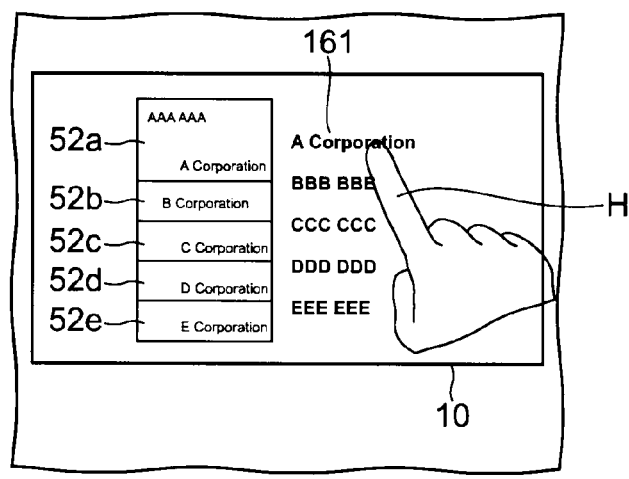
FIG. 16 are diagrams showing a state where wrong characters are corrected during execution of an animation in the another embodiment of the present invention.

As shown in FIG. 16A, a company name 161 is erroneously displayed at an area where a name is to be displayed in accordance with the business card image 52a out of the plurality of business card images 52 vertically arranged during execution of the animation. In such a case, as shown in FIG. 16A, the user touches the area where the company name 161 is erroneously displayed with the finger of the hand H or the like.

Figure 16B:
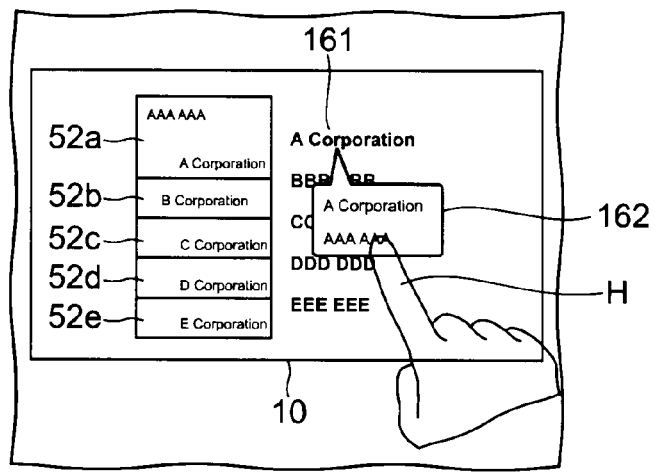

The CPU 11 of the portable information apparatus detects that touch based on the image shot by the camera 3. As shown in FIG. 16B, the CPU 11 then controls the projector 2 to display a correction candidate list box 162 for presenting, as correction candidates, a list of character strings that has been recognized from the business card image 52a.

Figure 16C:
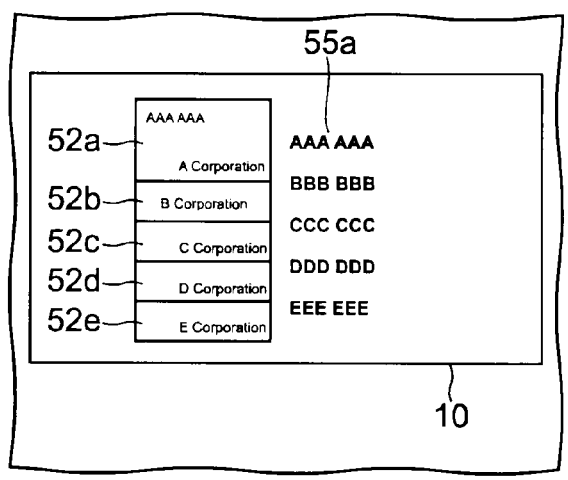

When the user selects a correct character string (name) from the correction candidate list box 162 by a touch of the finger as shown in FIG. 16B, the CPU 11 detects that touch from the image shot by the camera 3. Then, the CPU 11 changes the company name 161 that has been displayed until then for the selected character string (name 55a) as shown in FIG. 16C. Accordingly, a correct character string is also stored in the contact list in the flash memory 13.

Through the processing described above, the portable information apparatus 100 can cause the user to easily correct the error by presenting correction candidates to be touched by the user, even when the item of the character string to be recognized is wrong.

Instead of the correction candidate list box 162, the CPU 11 may display, for example, a software keyboard and correct the wrong character string by using a character string input from the keyboard by the user.

In the embodiment described above, the CD jacket and the business card are described as an example of the subject, but the subject is of course not limited thereto.

For example, the portable information apparatus 100 can capture a restaurant information card in restaurants as a subject, recognize character information from that captured image, and store that information as a part of a restaurant list.

Further, the portable information apparatus 100 can capture a wine bottle as a subject, recognize character information from that captured image, and store that information as a part of a wine list.

Examples of the portable information apparatus 100 to which the present invention can be applied in the embodiment described above include various information processing apparatuses such as a cellular phone, a PDA (Personal Digital Assistant), a smartphone, a portable music/video player, an electronic dictionary, and an electronic organizer. Moreover, the present invention is not limited to a portable information apparatus and is similarly applicable to various stationary information processing apparatuses.

The present application contains subject matter related to that disclosed in Japanese Priority Patent Application JP 2009-097723 filed in the Japan Patent Office on Apr. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a projector to project a projection image containing a first operation image onto a predetermined area;
a camera to shoot an image of a subject within the predetermined area;
a first storage; and
a controller to detect an operation to the first operation image based on the shot image shot by the camera and control the first storage to store at least the image of the subject out of the shot image when the operation is detected, wherein
the controller recognizes metadata of the subject based on the shot image and controls a second storage to store the metadata as a part of a predetermined list,
the controller controls the projector to include, in the projection image, information indicating whether the metadata has been recognized, and
the controller controls the projector to make illuminance of the projection image larger than illuminance before the operation is detected for a predetermined time period since the detection.

2. The information processing apparatus according to claim 1,
wherein the controller detects whether the subject is present within the predetermined area based on the shot image and controls the projector to include the first operation image in the projection image when it is detected that the subject is present within the predetermined area.

3. The information processing apparatus according to claim 2,
wherein the controller detects, after the image of the subject is stored in the first storage, whether the subject is moved from a position where the image of the subject has been stored, and controls the projector to project the image of the subject that is stored in the first storage to the position where the image of the subject has been stored when it is detected that the subject is moved.

4. The information processing apparatus according to claim 1,
wherein the controller controls the projector to project a pseudo animation showing how the metadata is being stored as a part of the predetermined list by using the image of the subject.

5. An information processing apparatus, comprising:
a projector to project a projection image containing a first operation image onto a predetermined area;
a camera to shoot an image of a subject within the predetermined area;
a first storage; and
a controller to detect an operation to the first operation image based on the shot image shot by the camera and control the first storage to store at least the image of the subject out of the shot image when the operation is detected, wherein
the controller recognizes metadata of the subject based on the shot image and controls a second storage to store the metadata as a part of a predetermined list, and the controller controls the second storage to store the metadata when it is detected that the subject whose metadata has been recognized is not present within the predetermined area based on the shot image.

6. The information processing apparatus according to claim 5,
wherein the controller recognizes pieces of metadata from a plurality of subjects that are present within the predetermined area and controls the second storage to store the pieces of metadata at a time as a part of the predetermined list when it is detected that all the plurality of subjects are not present within the predetermined area.

7. The information processing apparatus according to claim 5,
wherein the controller recognizes pieces of metadata from a first subject and a second subject that is a different type from that of the first subject, the first subject and the second subject being present within the predetermined area, and controls the second storage to store first metadata of the first subject as a part of a first list when it is detected that the first subject is not present within the predetermined area and store second metadata of the second subject as a part of a second list when it is detected that the second subject is not present within the predetermined area.

8. An information processing apparatus, comprising:
a projector to project a projection image containing a first operation image onto a predetermined area;
a camera to shoot an image of a subject within the predetermined area;
a first storage; and
a controller to detect an operation to the first operation image based on the shot image shot by the camera and control the first storage to store at least the image of the subject out of the shot image when the operation is detected, wherein
the controller recognizes metadata of the subject based on the shot image and controls a second storage to store the metadata as a part of a predetermined list, and
the controller controls the projector to include a second operation image different from the first operation image in the projection image when the metadata is recognized, detects an operation to the second operation image based on the shot image, and controls the second storage to store the metadata when the operation is detected.

9. The information processing apparatus according to claim 8,
wherein the controller recognizes pieces of metadata from a plurality of subjects that are present within the predetermined area and controls the second storage to store the pieces of metadata at a time as a part of the predetermined list when the operation to the second operation image is detected.

10. The information processing apparatus according to claim 8,
wherein the controller recognizes pieces of metadata from a first subject and a second subject that is a different type from that of the first subject, the first subject and the second subject being present within the predetermined area, and controls the second storage to store the first subject and first metadata of the first subject as a part of a first list and store the second subject and second metadata of the second subject as a part of a second list when the operation to the second operation image is detected.

* * * * *